(12) United States Patent
Scarth et al.

(10) Patent No.: US 12,077,380 B2
(45) Date of Patent: Sep. 3, 2024

(54) CART LOADER/UNLOADER AND A SWITCHER SYSTEM AND IMPROVEMENTS THEREIN

(71) Applicant: SailRail Automated Systems, Inc., Markham (CA)

(72) Inventors: Ian Scarth, King City (CA); Shawn Dawson, Bowmanville (CA)

(73) Assignee: SAILRAIL AUTOMATED SYSTEMS, INC., Markham (CA)

( * ) Notice: Subject to any disclaimer, the term of this patent is extended or adjusted under 35 U.S.C. 154(b) by 0 days.

(21) Appl. No.: 17/223,602

(22) Filed: Apr. 6, 2021

(65) Prior Publication Data

US 2021/0362948 A1 Nov. 25, 2021

Related U.S. Application Data

(63) Continuation-in-part of application No. 16/840,870, filed on Apr. 6, 2020.

(51) Int. Cl.
*B65G 1/04* (2006.01)
*B66F 7/06* (2006.01)

(52) U.S. Cl.
CPC .......... *B65G 1/0485* (2013.01); *B65G 1/0435* (2013.01); *B65G 2201/0267* (2013.01); *B65G 2814/0313* (2013.01); *B66F 7/0658* (2013.01); *B66F 7/0666* (2013.01)

(58) Field of Classification Search
CPC .......... B65G 1/0485; B65G 2201/0267; B65G 2814/0313; B66F 7/0658; B66F 7/0666
USPC ................................... 414/222.07, 286, 609
See application file for complete search history.

(56) References Cited

U.S. PATENT DOCUMENTS

| | | | |
|---|---|---|---|
| 2,903,219 A | 9/1959 | Ingham | |
| 3,361,999 A | 1/1968 | Leinauer et al. | |
| 3,608,920 A | 9/1971 | Rubin | |
| 3,887,207 A | 6/1975 | Gotsch | |
| 4,515,518 A | 5/1985 | Gilbert et al. | |
| 4,568,233 A * | 2/1986 | Baker | B65G 1/0464 414/561 |

(Continued)

FOREIGN PATENT DOCUMENTS

| | | | |
|---|---|---|---|
| CA | 3001808 A1 * | 10/2018 | .......... B65G 1/0407 |
| CA | 3001808 A1 | 10/2018 | |

(Continued)

*Primary Examiner* — James Keenan
(74) *Attorney, Agent, or Firm* — Workman Nydegger

(57) ABSTRACT

A system for providing uninterrupted delivery of industrial parts to a production line or facility, the system defining a loading side and an operating side, a lift mechanism configured to move a lift frame, when in an elevated position, between the loading side and the operating side, a controller for controlling the lift mechanism, a first and second carriages movable between a lowered position and the elevated position, a first sensor that detects a carriage is a loading/unloading position at the loading side, and a second sensor that detects when a carriage is positioned in a loading/unloading position at the operator side, and the controller is further configured to move the second carriage between the loading side and the operator side when the first carriage is in the elevated position, and the controller is responsive to an input from the second sensor indicating a breach condition.

17 Claims, 24 Drawing Sheets

(56) References Cited

U.S. PATENT DOCUMENTS

| | | | |
|---|---|---|---|
| 4,687,215 A | | 8/1987 | Brendgord et al. |
| 4,815,914 A | * | 3/1989 | O'Brien .................... B65G 1/02 |
| | | | 414/285 |
| 4,971,506 A | * | 11/1990 | Givati ...................... E04H 6/182 |
| | | | 414/256 |
| 5,020,382 A | * | 6/1991 | Lutz .......................... B66F 9/04 |
| | | | 414/609 |
| 5,129,776 A | * | 7/1992 | Peng .................... B66F 7/0658 |
| | | | 414/228 |
| 5,310,305 A | * | 5/1994 | Lutz ........................ B65G 1/127 |
| | | | 414/609 |
| D448,135 S | | 9/2001 | Petro |
| 6,286,654 B1 | * | 9/2001 | Gorniak ............... B65G 1/0414 |
| | | | 198/347.4 |
| 6,676,233 B1 | * | 1/2004 | Evans ...................... B66B 9/02 |
| | | | 187/401 |
| 6,866,463 B2 | | 3/2005 | Riordan et al. |
| 7,559,736 B1 | | 7/2009 | Mohan |
| 7,806,646 B2 | | 10/2010 | Riordan et al. |
| 8,109,526 B2 | | 2/2012 | Mason et al. |
| 8,302,975 B2 | | 11/2012 | Hergeth |
| 8,360,459 B2 | | 1/2013 | Holtan et al. |
| 8,505,933 B2 | | 8/2013 | Bernard et al. |
| 8,540,255 B2 | | 9/2013 | Young |
| 8,590,921 B2 | | 11/2013 | Benson et al. |
| 9,078,967 B2 | | 7/2015 | Oerter et al. |
| 9,211,900 B2 | | 12/2015 | Knepp |
| 9,227,645 B2 | | 1/2016 | Franco |
| 9,290,214 B2 | | 3/2016 | Badura et al. |
| 9,561,910 B1 | * | 2/2017 | Orsini .................... B65G 19/02 |
| 9,676,314 B2 | | 6/2017 | Neubauer |
| 9,738,299 B2 | | 8/2017 | Ard et al. |
| 9,738,465 B2 | | 8/2017 | Berghammer |
| 9,862,435 B2 | | 1/2018 | Scarth et al. |
| 10,093,334 B1 | | 10/2018 | Brown et al. |
| 10,207,308 B2 | * | 2/2019 | Kowal .................... B21D 28/04 |
| 10,377,434 B2 | | 8/2019 | Berghammer |
| 10,391,625 B2 | | 8/2019 | Gang et al. |
| 10,640,297 B2 | * | 5/2020 | Kilibarda ............... B65G 35/06 |
| 11,014,593 B2 | | 5/2021 | Knepp et al. |
| 2010/0066045 A1 | | 3/2010 | Presnell et al. |
| 2019/0225285 A1 | | 7/2019 | Packeiser et al. |
| 2023/0348192 A1 | * | 11/2023 | Forster ................. B65G 1/1371 |

FOREIGN PATENT DOCUMENTS

| | | | |
|---|---|---|---|
| DE | 102010043207 A1 | 3/2012 | |
| WO | 2015071268 A1 | 5/2015 | |
| WO | WO-2015071268 A1 * | 5/2015 | ........... B65G 47/082 |

* cited by examiner

Loading Full Rack Into Position 1 - Empty Machine

Full Rack Moves To Position 2 - Line Side

Second Full Rack Loaded Into Position 1

Second Full Rack Raised To Position 4 - "Pre - State Position"

CART LOADER/UNLOADER AND A SWITCHER SYSTEM AND IMPROVEMENTS THEREIN

CROSS-REFERENCE TO RELATED APPLICATIONS

This application is a continuation-in-part, and hereby claims the benefit, of U.S. patent application Ser. No. 16/840,870, entitled CART LOADER/UNLOADER AND A SWITCHER SYSTEM, and filed Apr. 6, 2020. The aforementioned application is incorporated herein in its entirety by this reference.

FIELD OF THE INVENTION

The present invention relates to industrial cart systems, and more particularly, to industrial cart loading/unloading and a cart switching system.

BACKGROUND OF THE INVENTION

In the art, forklifts are typically used to deliver or move materials, for example, palletized loads, or loads contained in bins, in a factory or other industrial plant.

For mass manufacturing, the industry typically utilizes an assembly line configuration wherein a product, for example, an automobile, is assembled or built in a sequence of operations performed at stations configured along the assembly line. To support the continuous operation of the assembly line, parts or components must be replenished continuously and in a timely manner. Since there are space restrictions for the stations along the assembly line, the parts or components cannot be stock piled and must be restocked in near real-time and prior to demand. It will be appreciated that this places a high premium on logistical control and movement of parts within the manufacturing facility and bottlenecks in the supply of fresh parts or components can arise.

Accordingly, there remains a need for improvements in the art.

BRIEF SUMMARY OF THE INVENTION

The present invention is directed to an industrial cart loading/unloading and a switcher system.

According to an embodiment, the present invention comprises a cart switcher system comprising: a base member having a loading end and an operator end; a first carriage for carrying a bin, said first carriage being operatively coupled to said base member and configured to move between said loading end and said operator end; a second carriage for carrying another bin; a bypass mechanism configured to support said second carriage and said other bin; said bypass mechanism being operatively coupled to said base member and configured to move between said loading end and said operator end; and said bypass mechanism being further configured to operate in a bypass mode, and in said bypass mode said bypass mechanism being operable to permit movement of said first carriage and said bin between said loading end and said operator end.

According to another embodiment, the present invention comprises a rack loader/unloader and switcher system comprising: a base having a loading end and an operator side end, and said base including a first track and a second track; a first carriage configured for carrying a rack, said first carriage being operatively coupled to move on said first track; a controller; a first drive mechanism operatively coupled to said first carriage for moving said first carriage between said loading end and said operator side end, and said first drive mechanism being responsive to one or more control signals from said controller for controlling movement of said first carriage between said loading end and said operator end; a second carriage configured for carrying another rack; a travel lift mechanism configured to support said second carriage and said other rack, said travel lift mechanism being operatively coupled to move on said second track; a second drive mechanism operatively coupled to said travel lift mechanism for moving said travel lift mechanism between said loading end and said operator side end, and said second drive mechanism being responsive to one or more control signals from said controller for controlling movement of said travel lift mechanism between said loading end and said operator end; said travel lift mechanism further including a lift drive mechanism operatively coupled to said second carriage, said lift drive mechanism being responsive to one or more control signals from said controller for controlling movement of said second carriage between a lowered position and a raised position; and wherein in said raised position, said travel lift mechanism is configured to allow movement of said first carriage on said first track under said second carriage and between said loading end and said operator side end.

According to another embodiment, the present invention comprises a loader/unloader and switcher system comprising: a frame having a loading end and an operator end; a first carriage for carrying a bin; a second carriage for carrying another bin, said second carriage being operatively coupled to said frame and configured to move between said loading end and said operator end; a bypass mechanism operatively coupled to said frame and configured to support said first carriage and said bin; and said bypass mechanism being further configured to operate in a bypass mode, and in said bypass mode said bypass mechanism being operable to permit movement of said second carriage and said other bin between said loading end and said operator end.

According to another embodiment, the present invention comprise an industrial bin loader/unloader and switcher system comprising: a frame having a loading end and an operator side end, and said frame including a track; a first carriage configured for carrying a first bin; a second carriage configured for carrying a second bin; a controller; a travel lift mechanism configured to support said first carriage and said first bin, said travel lift mechanism configured to raise and lower said first carriage and said first bin in a generally vertical direction; a first drive mechanism operatively coupled to said travel lift mechanism for moving said travel lift mechanism between said loading end and said operator side end, and said first drive mechanism being responsive to one or more control signals from said controller for controlling movement of said travel lift mechanism between said loading end and said operator end; said travel lift mechanism further including a lift drive mechanism operatively coupled to said first carriage, said lift drive mechanism being responsive to one or more control signals from said controller for controlling movement of said first carriage between a lowered position and a raised position; a second drive mechanism operatively coupled to said second carriage for moving said second carriage between said loading end and said operator side end, and said second drive mechanism being responsive to one or more control signals from said controller for controlling movement of said second carriage between said loading end and said operator end; and wherein in said raised position, said travel lift mechanism being configured to allow movement of said second carriage on said track under said first carriage and between said loading end and said operator side end.

Other aspects and features of the present invention will become apparent to those ordinarily skilled in the art upon review of the following description of embodiments of the invention and/or the accompanying figures.

BRIEF DESCRIPTION OF THE DRAWINGS

Reference will now be made to the accompanying drawings which show, by way of example, embodiments of the present invention, and in which.

In the drawings, like reference numerals indicated like components or elements.

DETAILED DESCRIPTION OF THE EMBODIMENTS OF THE INVENTION

Figure 1:
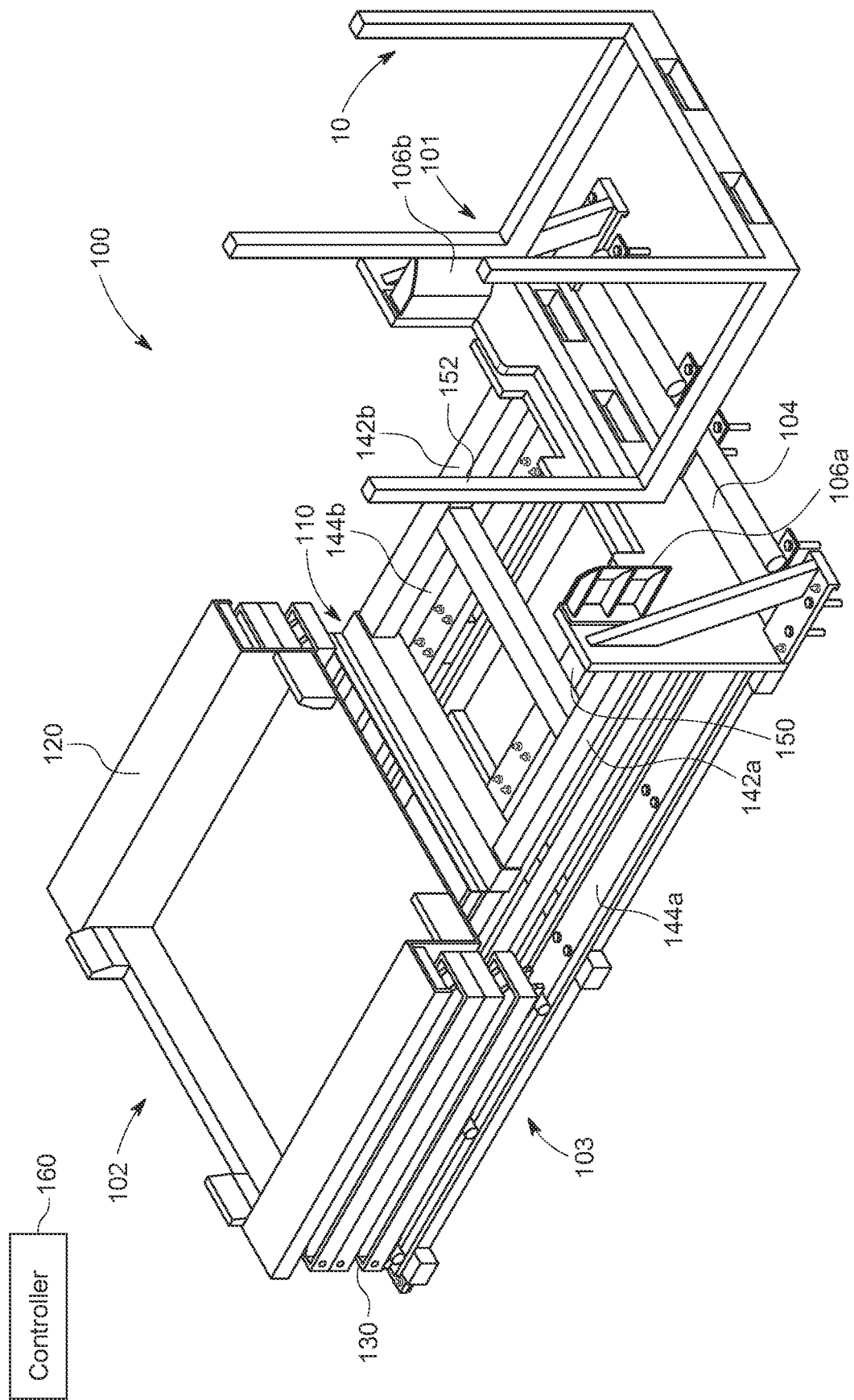
FIG. 1 shows in diagrammatic form a cart or rack loader/unloader and switcher system according to an embodiment of the present invention with a rack or bin ready for loading at a forklift loading stage or side.

Reference is first made to FIG. 1, which shows a rack or bin cart loader/unloader and switcher system according to an embodiment of the present invention and indicated generally by reference 100. According to an embodiment, the rack loader/unloader and switcher system 100 comprises a support base or member 103, a first transfer carriage 110, a second transfer carriage 120, and a lift mechanism 130. The second transfer carriage is coupled to and carried by the lift mechanism 130. In an exemplary implementation, the support base includes one or more rails or tracks 140, indicated individually by references 142a and 142b, for a dual rail or track arrangement, configured to support and/or guide the first transfer carriage 110 between a loading/unloading position or stage indicated generally by reference 101 and an operator side or line position or stage indicated generally by reference 102, in FIG. 1. The support base includes one or more rails or tracks 144, indicated individually by references by 144a and 144b configured to support and guide the lift mechanism 130 back and forth between the loading/unloading stage 101 and the operator side or line position 102, for example, in a generally horizontal plane as will be described in more detail below.

Referring still to FIG. 1, the switcher system 100 includes a drive mechanism for the first transfer carriage 110 indicated generally by reference 150. According to an exemplary implementation, the drive mechanism 150 comprises a hydraulic actuator, or a belt drive, configured to move the first transfer carriage 110 on the rails 142 back and forth between the loading/unloading position 101 and the operator side position 102. The drive mechanism 150 may be implemented using other types of drive motors or actuators, for example, a motor and a worm-gear drive. Similarly, the switcher system 100 includes a drive mechanism for the lift mechanism 130 and indicated generally by reference 152. The drive mechanism is configured to move the second transfer carriage 120 on the rails 142 and in an elevated position back and forth between the loading/unloading position 101 and the operator side position 102. The drive mechanism 152 may be implemented using other types of drive motors or actuators, for example, a motor and a worm-gear drive. In the context of the present description, the travel lift mechanism comprises the second transfer carriage 120 and the lift mechanism 130.

Figure 14:
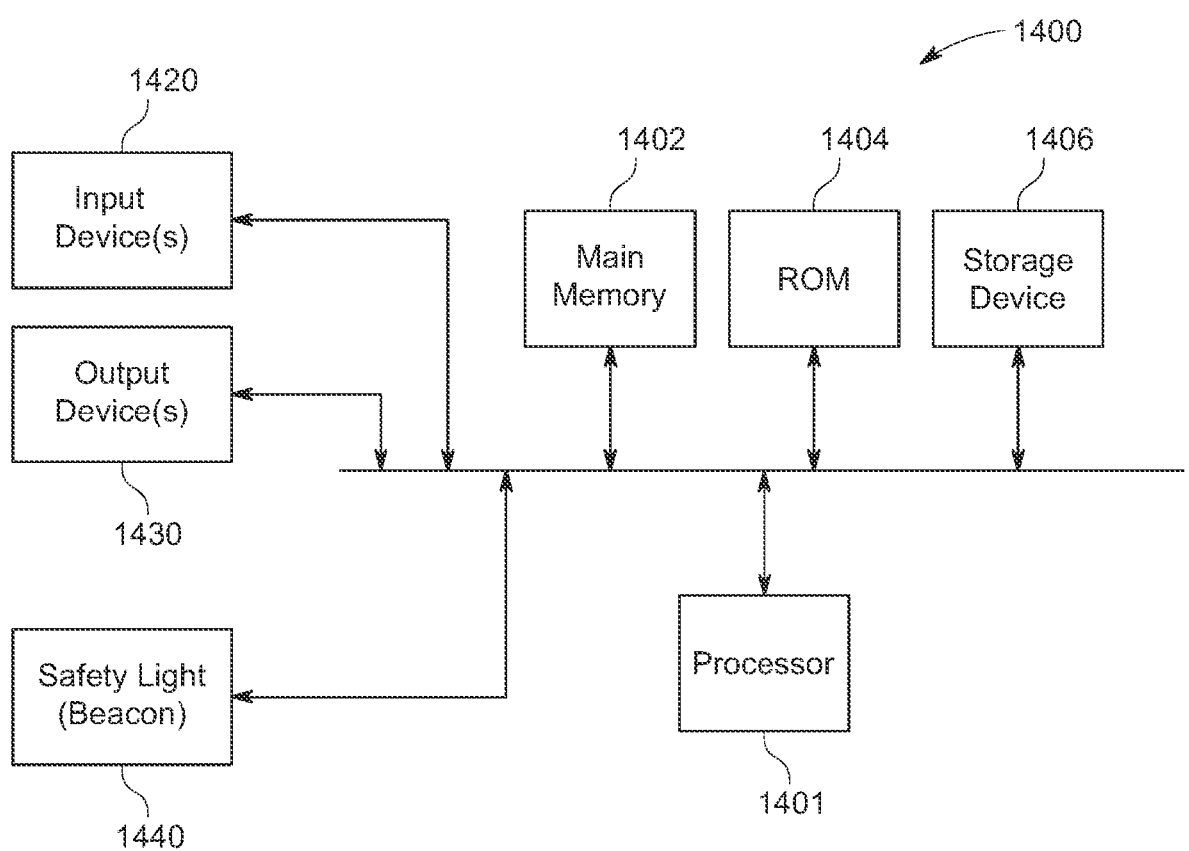
FIG. 14 shows in block diagram form an exemplary configuration for a controller or control module for the switcher system suitable for implementing the functional and operational control of the system according to embodiments of the present invention.

As also shown in FIG. 1, the rack loader/unloader and switcher system 100 includes a controller indicated generally by reference 160. The controller 160 comprises a programmable logic device, or a microprocessor-based device programmed to operate under stored-program control, to provide the functionality and operational control of the switcher system 100 as described herein. The controller 160 may be implemented with a configuration as shown in FIG. 14. According to another embodiment, or implementation, the controller comprises a relay logic system, e.g. a relay logic controller and/or relay logic board, coupled to the relay (switches and/or sensors or other compatible input devices) devices as described above the particular hardware implementation details, and/or software programming, and/or logic or relay logic function details, will be within the understanding of those skilled in the electronic hardware, logic control circuits, relay logic control, and programming arts.

As shown in FIG. 1, the loader/unloader and switcher system 100 may also include with a protection plate indicated by reference 104 at the end of the base 103 on the loading/unloading side 101. The base 103 may further include forklift guides 106, indicated individually by references 106a and 106b.

Figure 2:
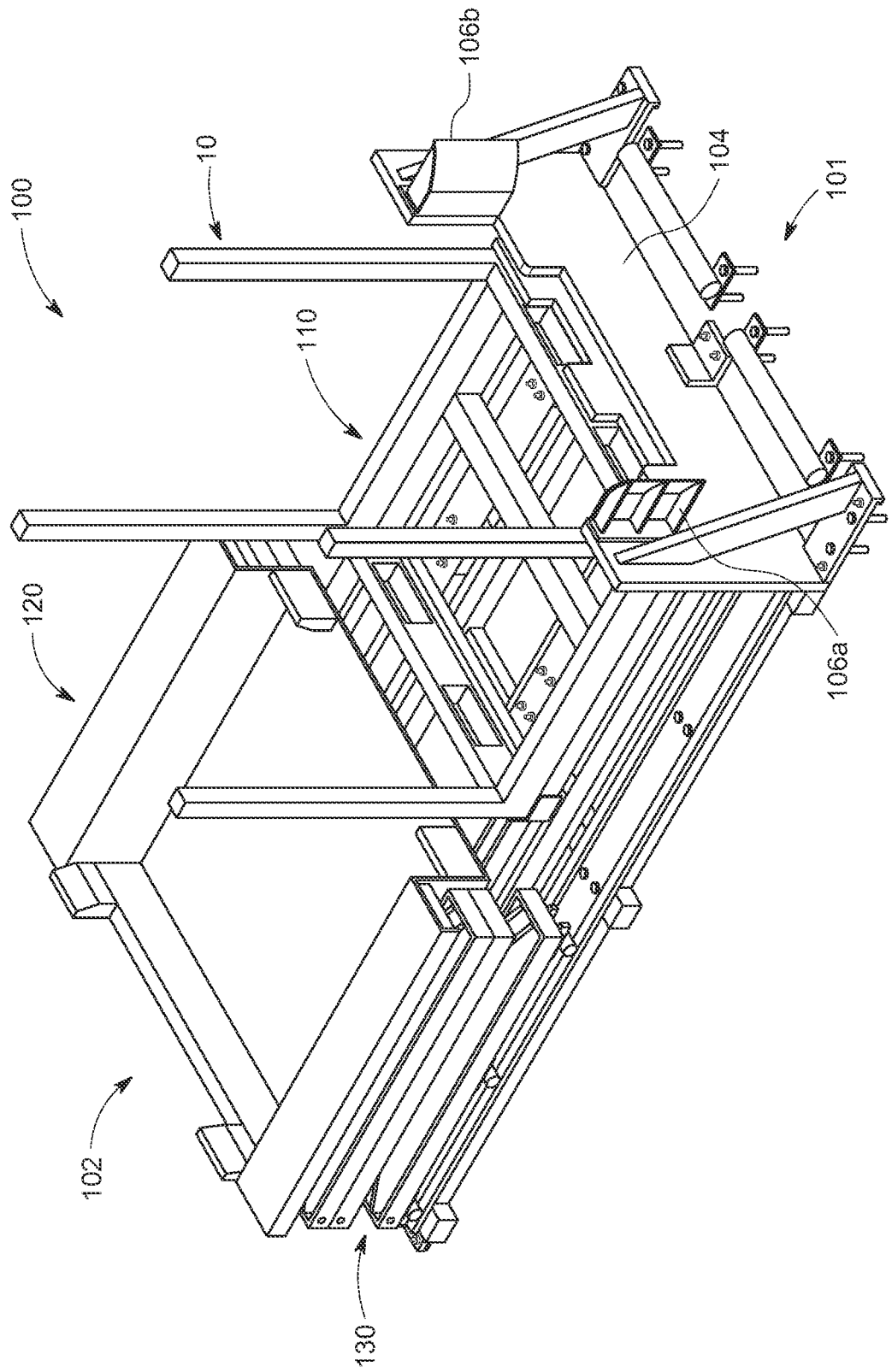
FIG. 2 shows the cart or rack loader/unloader and switcher of FIG. 1 with a rack or bin loaded or positioned on the first transfer carriage of the switcher.

Reference is next made to FIG. 2, which shows the rack loader/unloader and switcher system 100 with a rack or bin 10 loaded or positioned on the first transfer carriage 110. The bin(s) 10 (11) may comprise a bin or a rack loaded with parts or components, or a cart loaded with parts or components. In the context of the present description, the rack 10 is loaded with parts or components utilized on an assembly line in an automobile manufacturing facility or application. As also shown, the lift mechanism 130 is in a lowered or retracted position which provides an operator, e.g. an assembly line worker, access to the rack or bin loaded on the second transfer carriage 120 which located on the operator or line side 102 of the switcher 100.

Figure 3:
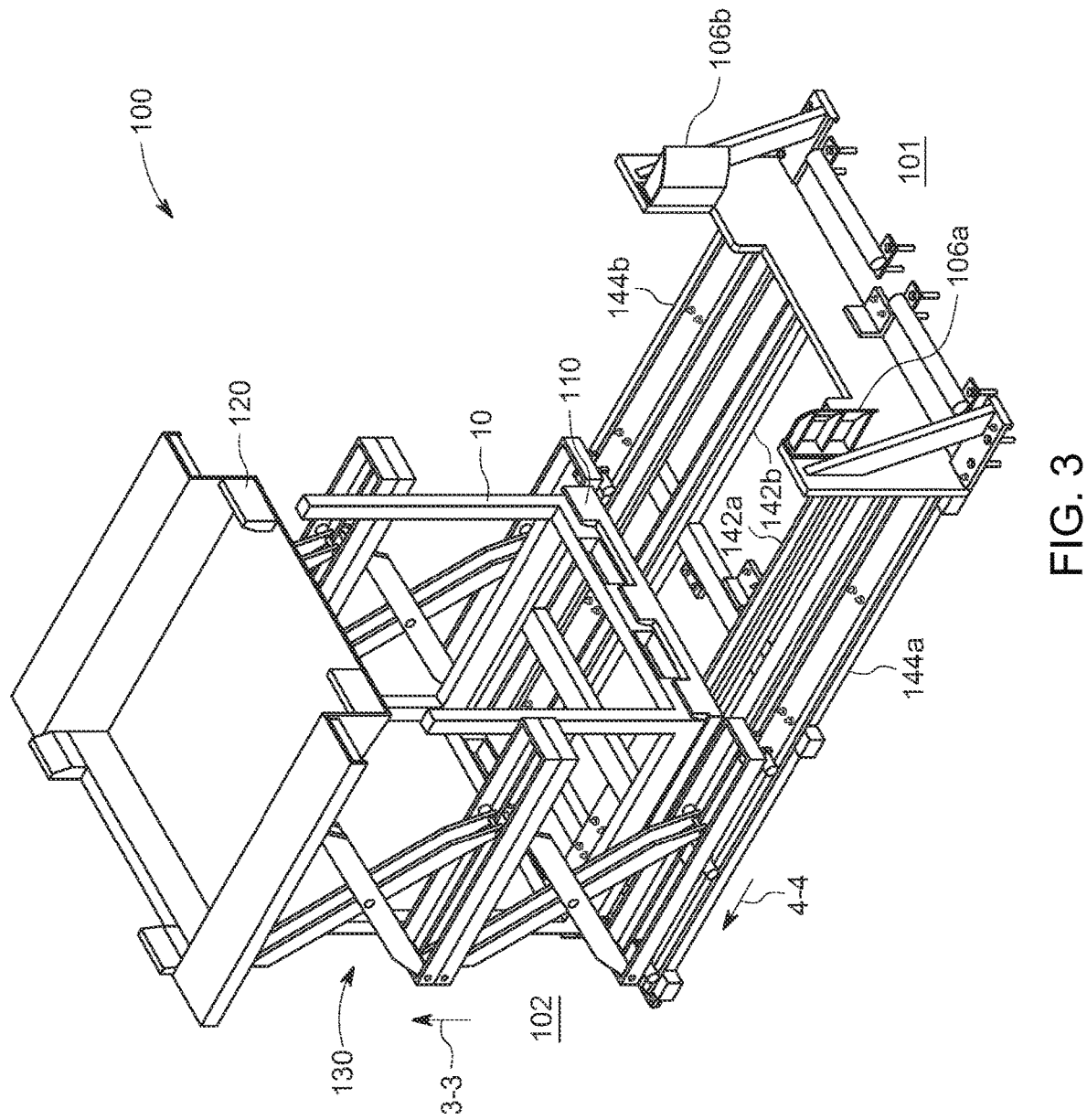
FIG. 3 shows the cart or rack loader/unloader and switcher of FIG. 2 with the second transfer carriage and the travel lift mechanism in an extended or raised position or condition at the operator line side.
Figure 4:
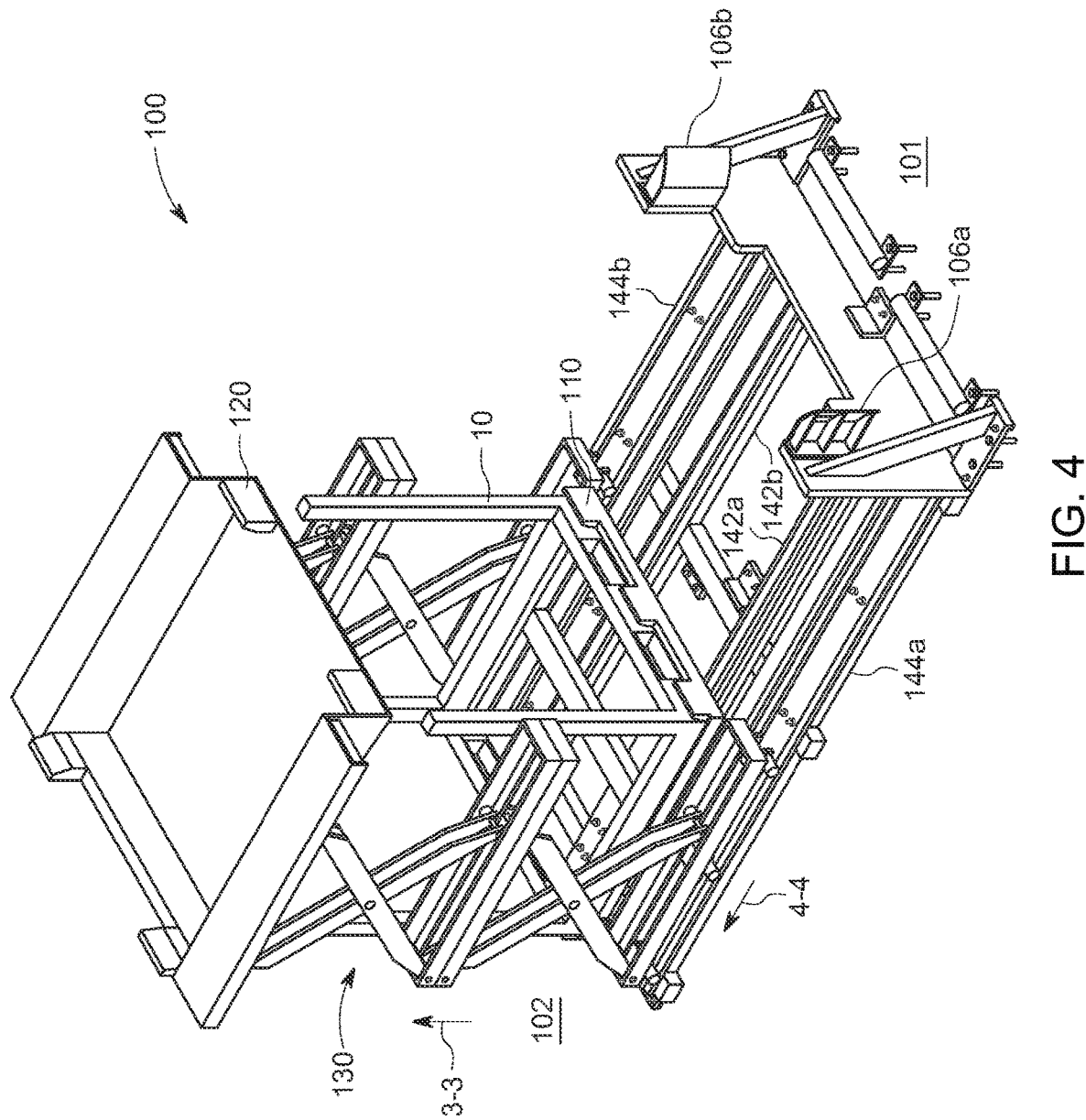
FIG. 4 shows the cart or rack loader/unloader and switcher of FIG. 3 in with the first transfer carriage and the loaded rack moved to the operator line side and the second transfer carriage maintained in a raised or elevated position at the operator line side.

Reference is made to FIG. 3, which shows the loader/unloader and switcher system 100 with a travel lift mechanism 130 in an extended or raised position or condition, at the operator line side 102, as indicated by arrow 3-3. With the second transfer carriage 120 in a raised position at the operator line side 102, the first transfer carriage 110 with a loaded rack or a new rack can be moved into position at the operator line side 102 as shown in FIG. 4, and indicated by arrow 4-4. It will be appreciated that the configuration of the switcher 100 according to this embodiment provides the capability to move or manipulate two racks, or two bins, in the same footprint between the loading/unloading side 101 and the operator line side 102. For instance, by effectively utilizing the available vertical or height clearance normally available at the assembly line station. It will be further appreciated that since floor space alongside an assembly line or automated manufacturing facility is typically limited, the capability to handle two containers simultaneously or sequentially is advantageous, and can serve to prevent bottlenecks arising from delayed delivery of parts or components.

Figure 5:
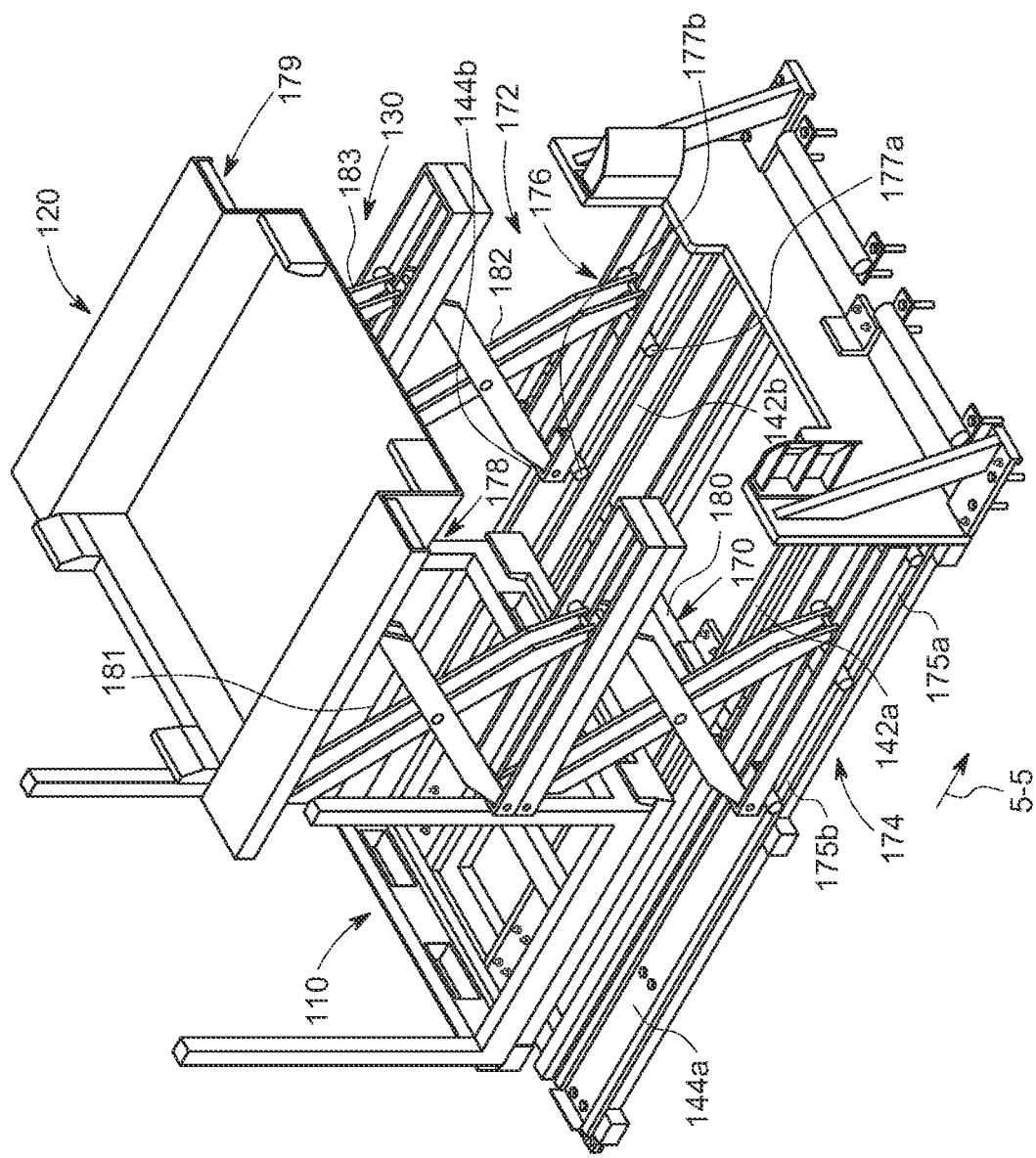
FIG. 5 shows the cart or rack loader/unloader and switcher of FIG. 4 with the second transfer carriage moved to the forklift loading side and maintained in a raised or elevated position by the travel lift mechanism.
Figure 6:
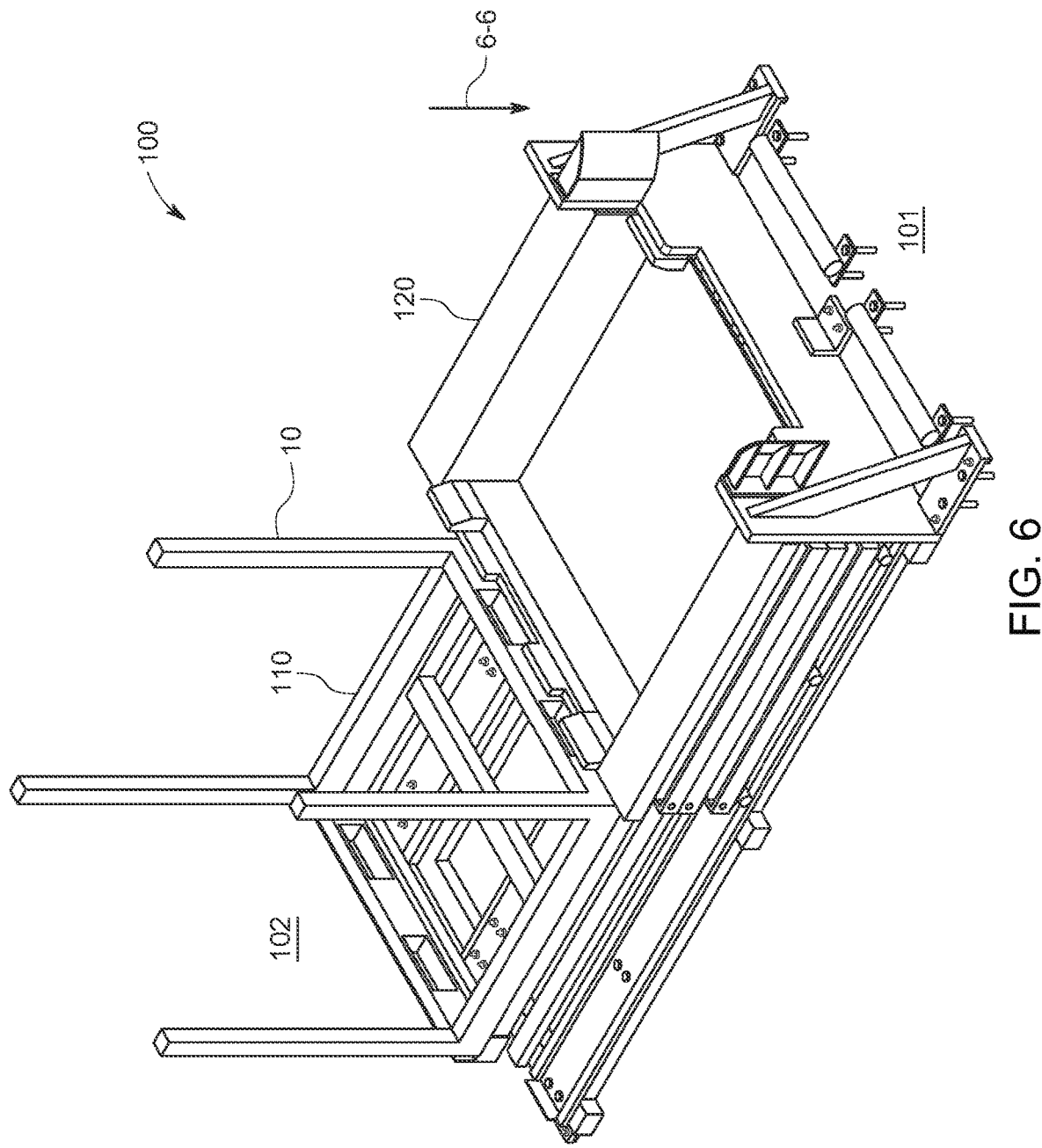
FIG. 6 shows the cart or rack loader/unloader and switcher system of FIG. 5 with the second transfer carriage lowered by the travel lift mechanism to a lower position for unloading an empty rack on the carriage at the forklift loading/unloading side or station.
Figure 7:
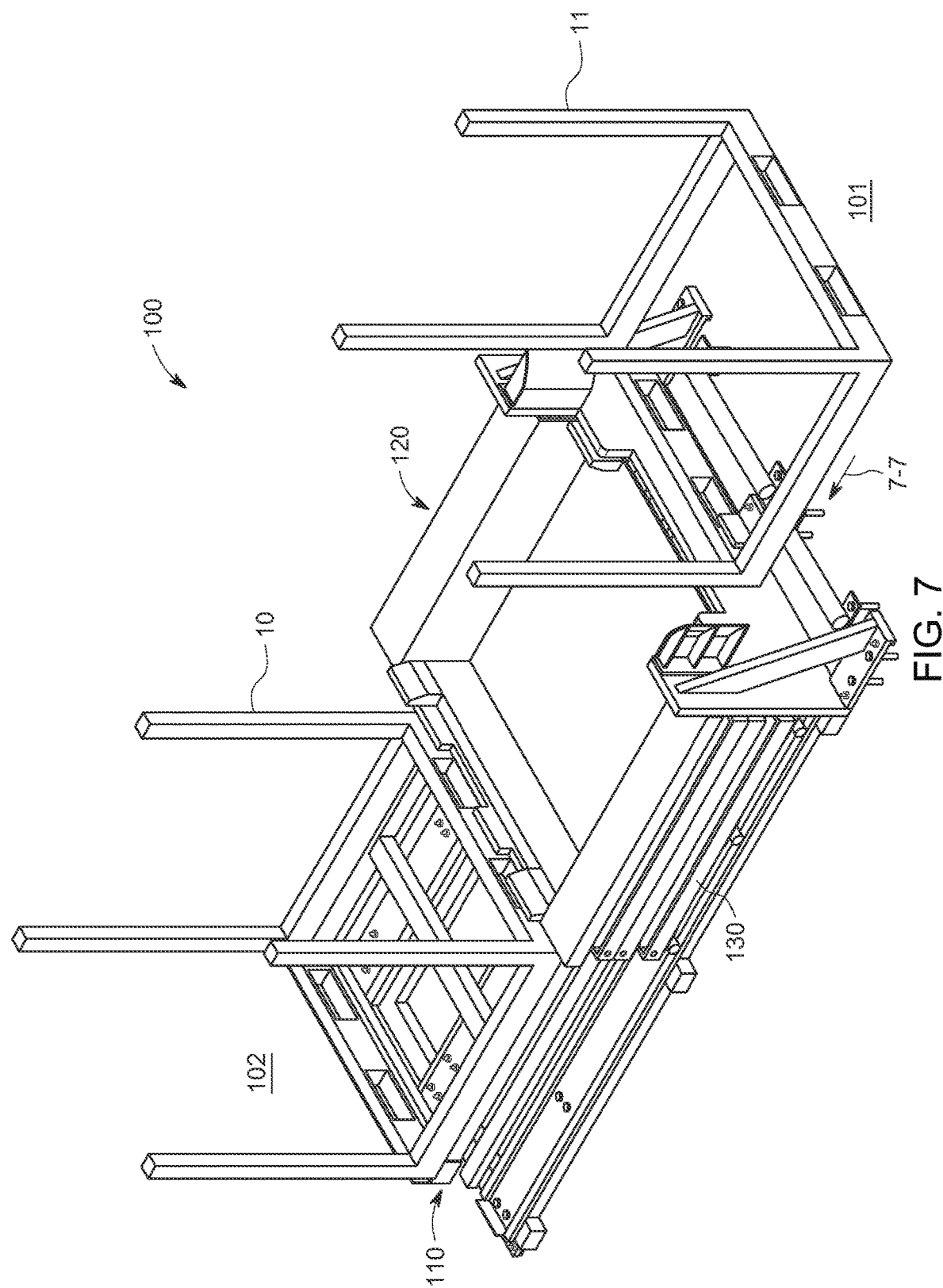
FIG. 7 shows the cart or rack loader/unloader and switcher system of FIG. 6 with a new or full rack ready for loading onto the second transfer carriage at the forklift loading/unloading side or station.
Figure 8:
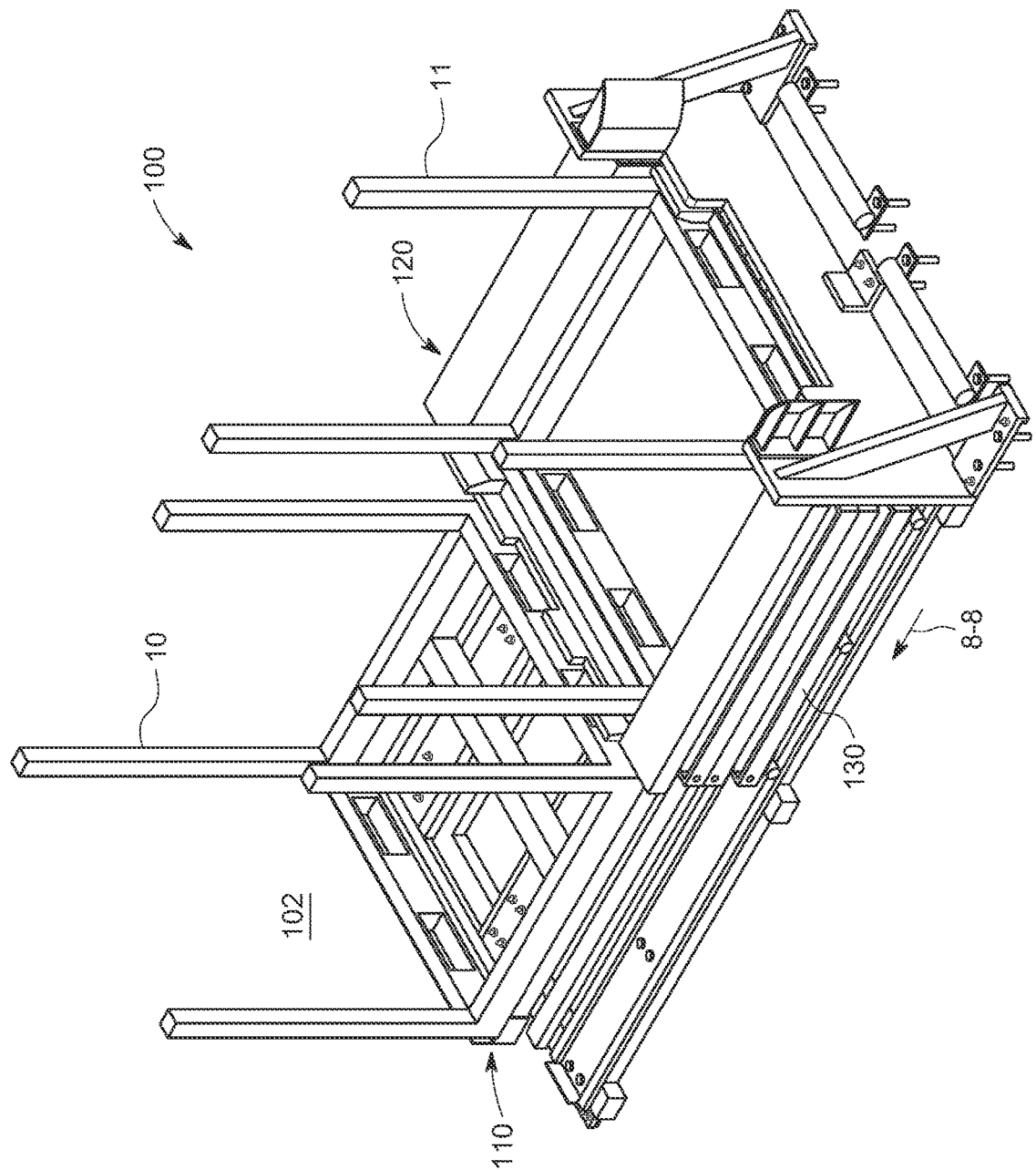
FIG. 8 shows the cart or rack loader/unloader and switcher system of FIG. 7 with the new rack (full) loaded onto the second transfer carriage at the forklift loading/unloading side.
Figure 9:
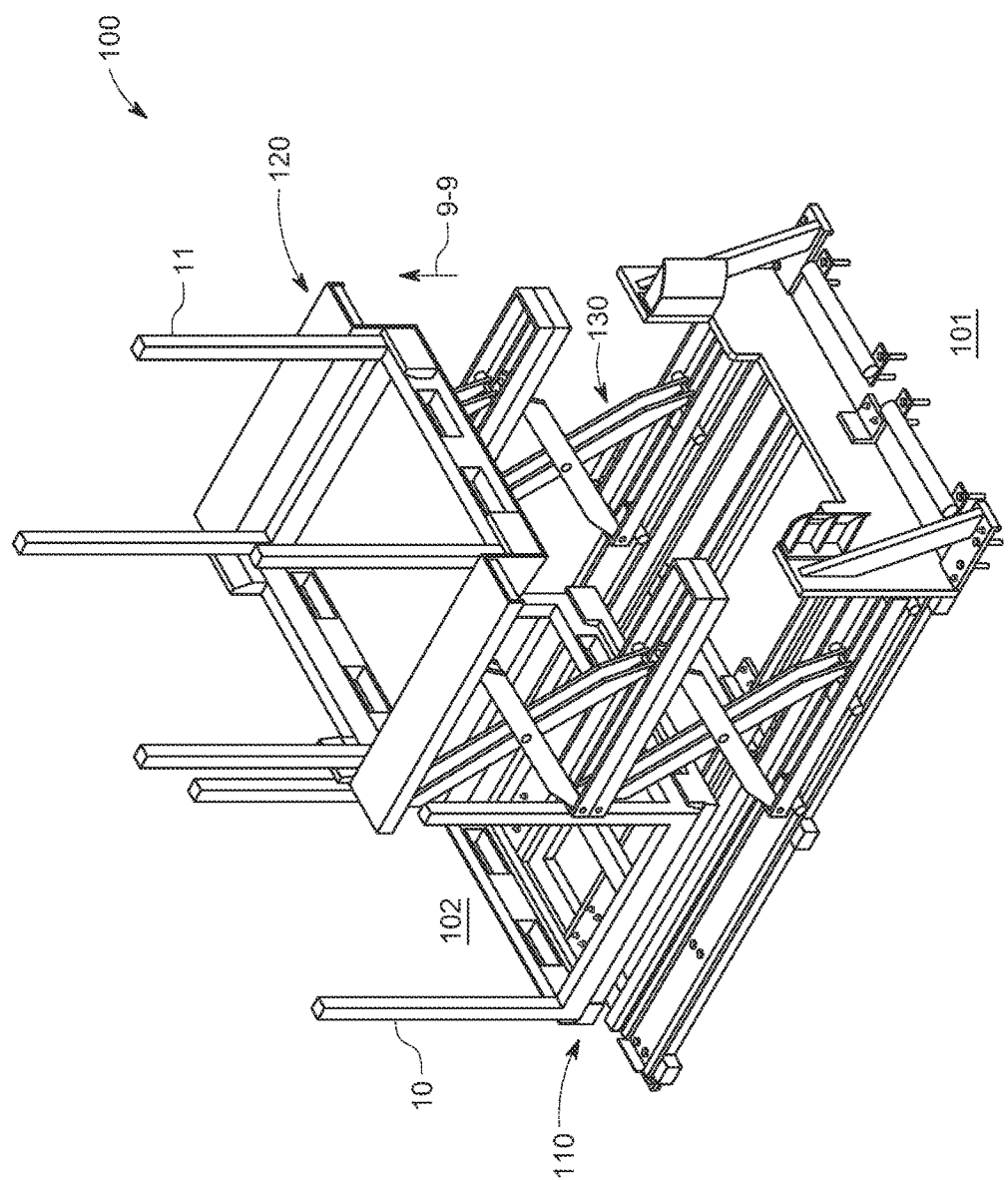
FIG. 9 shows the cart or rack loader/unloader and switcher system of FIG. 8 with second transfer carriage and loaded rack raised to elevated or vertical position by the travel lift mechanism.
Figure 10:
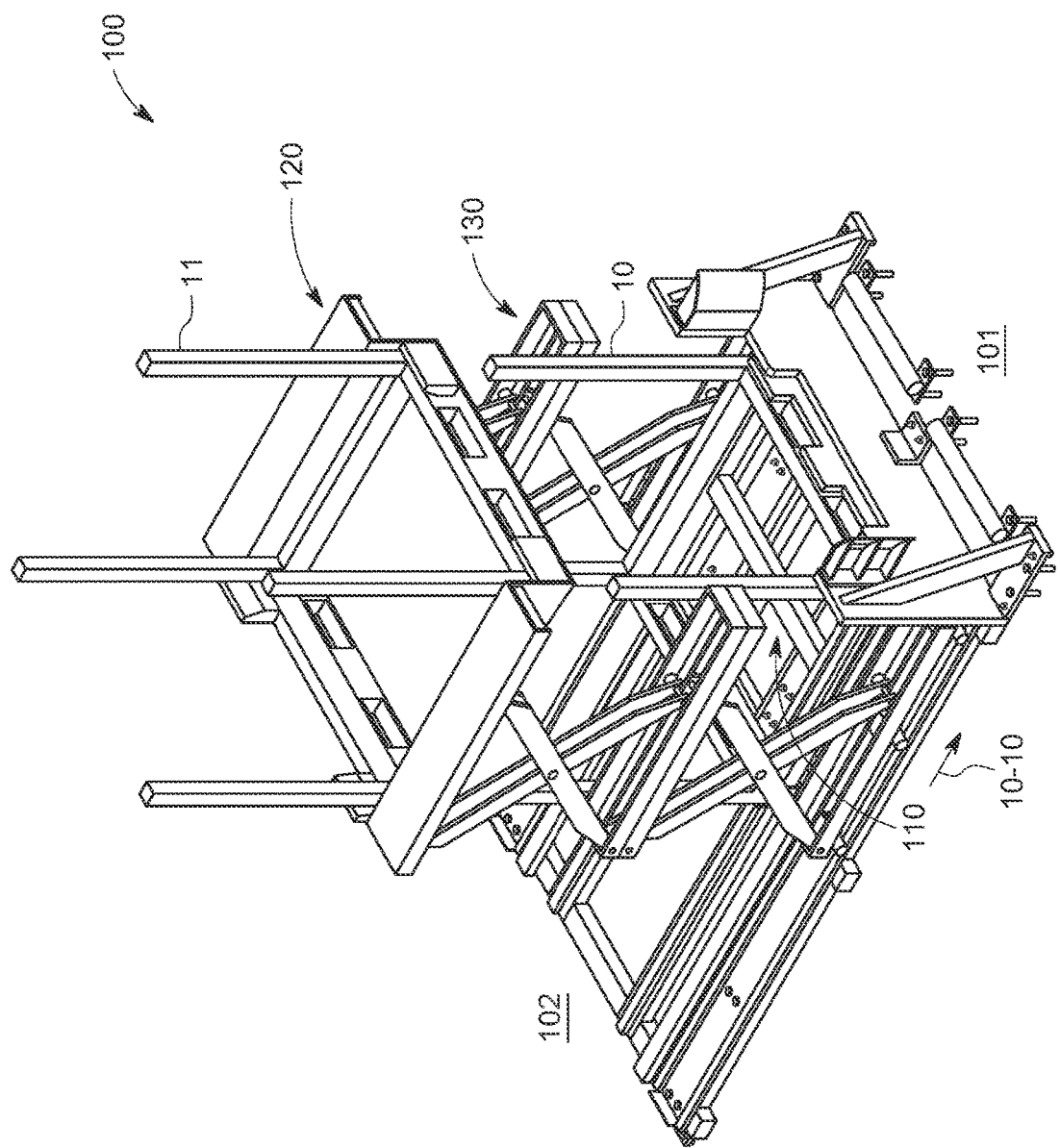
FIG. 10 shows the cart or rack loader/unloader and switcher system of FIG. 9 with the first transfer carriage moved to the forklift loading/unloading side and in a position below the travel lift mechanism to allow unloading of the rack (empty) from the first transfer carriage.

Reference is next made to FIG. 5, which shows the rack loader/unloader and switcher 100 with the travel lift mechanism 130 moved to the loading/unloading side 101, as indicated by arrow 5-5, and the second transfer carriage 120 in a raised or elevated position with the lift mechanism 130 in an extended or raised position. The second transfer carriage 120 is then lowered by the lift mechanism 130 at the loading/unloading side 101, as indicated by arrow 6-6 in FIG. 6. With the second transfer carriage 120 in a lowered position, an empty bin or rack can be unloaded, for example, using a forklift, and/or a loaded rack 11 (e.g. a bin, a rack or a cart) can be positioned for loading shown in FIG. 7 and indicated by arrow 7-7, and then loaded onto the second transfer carriage 120 as shown in FIG. 8, as indicated by arrow 8-8. The lift mechanism 130 is then actuated (for example, under the control of the controller 160 as described in more detail below), to raise the second transfer carriage 120 with the newly loaded rack or bin 11 to an elevated position as indicated by arrow 9-9 in FIG. 9. In the elevated position, the second transfer carriage 120 can be moved by the travel lift mechanism 130 over the rack or bin 10 loaded on the first transfer carriage 110, and/or the first transfer carriage 110 with the rack 10 can be moved under the elevated second transfer carriage 120, either substantially simultaneously or in sequence. As shown in FIG. 10, the first transfer carriage 110 with an empty rack 10 is moved from the operator line 102 to a position underneath the second transfer carriage 120 at the loading/unloading side 101, as indicated by arrow 10-10.

As also shown in FIG. 5, the lift mechanism 130 comprises a pair of scissor lift mechanisms indicated individually by references 170 and 172. Each scissor lift mechanism 170 and 172 has a base indicated by references 174 and 176, respectively, and an upper shelf or support section, indicated by references 178 and 179, respectively. The base 174 of the first scissor lift mechanism 170 is configured to couple to and ride the rail(s) 144a, and may comprise one or more rollers 175, indicated individually by references 175a, 175b. Similarly, the base 176 of the second scissor lift mechanism 172 is configured to couple to and ride the rail(s) 144b, and may comprise one or more rollers 177, indicated individually by references 177a, 177b. Each of the upper support sections 178, 179 is configured to support and attach a respective side or section of the second transfer carriage 120 as also shown in FIG. 5. The drive mechanism 152 is operatively coupled to the base 174 and/or the base 176 and configured to move the second transfer carriage 120 and the lift mechanism 130, i.e. the travel lift mechanism, back and forth between the loading/unloading station 101 and the operator side station 102 under the control of the controller 160 as described in more detail below.

Figure 11:
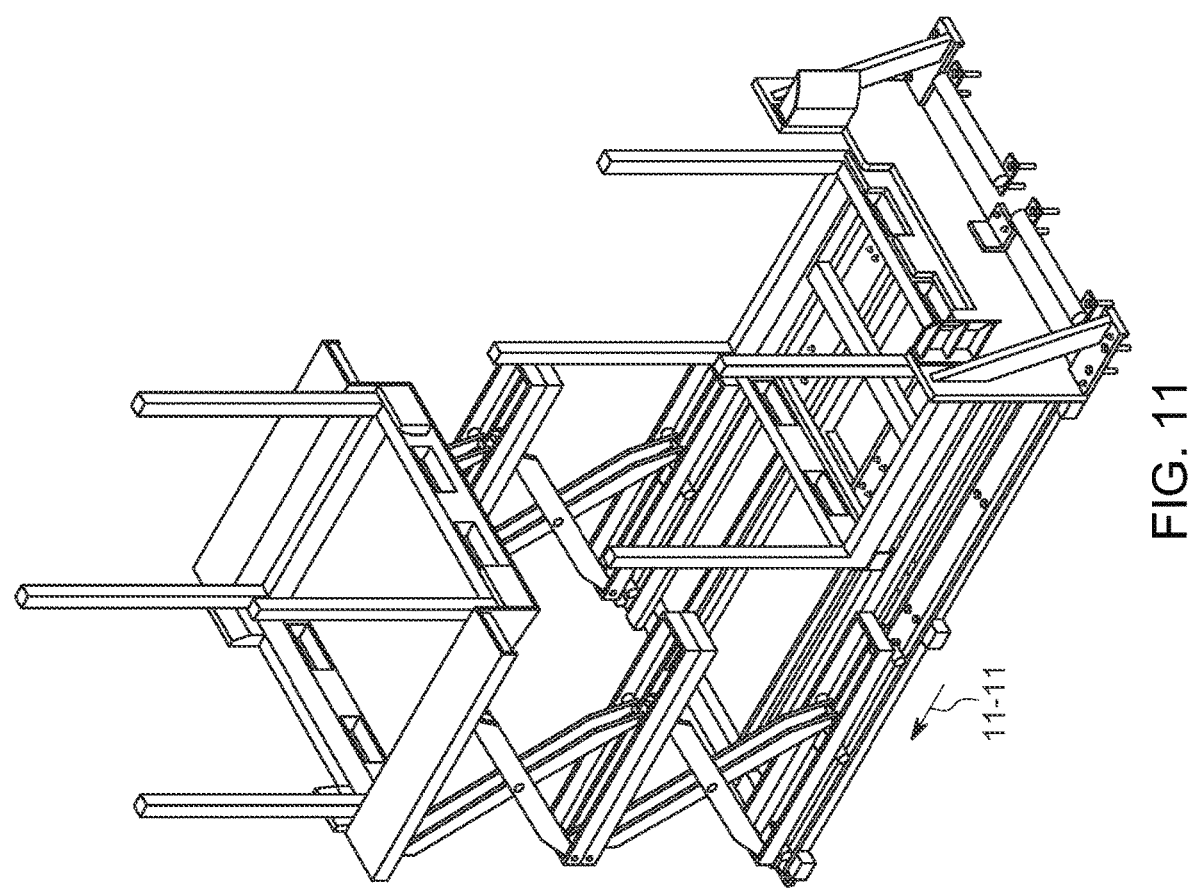
FIG. 11 shows the cart or rack loader/unloader and switcher system of FIG. 10 with second transfer carriage and loaded rack moved by the travel lift mechanism to the operator line side.
Figure 12:
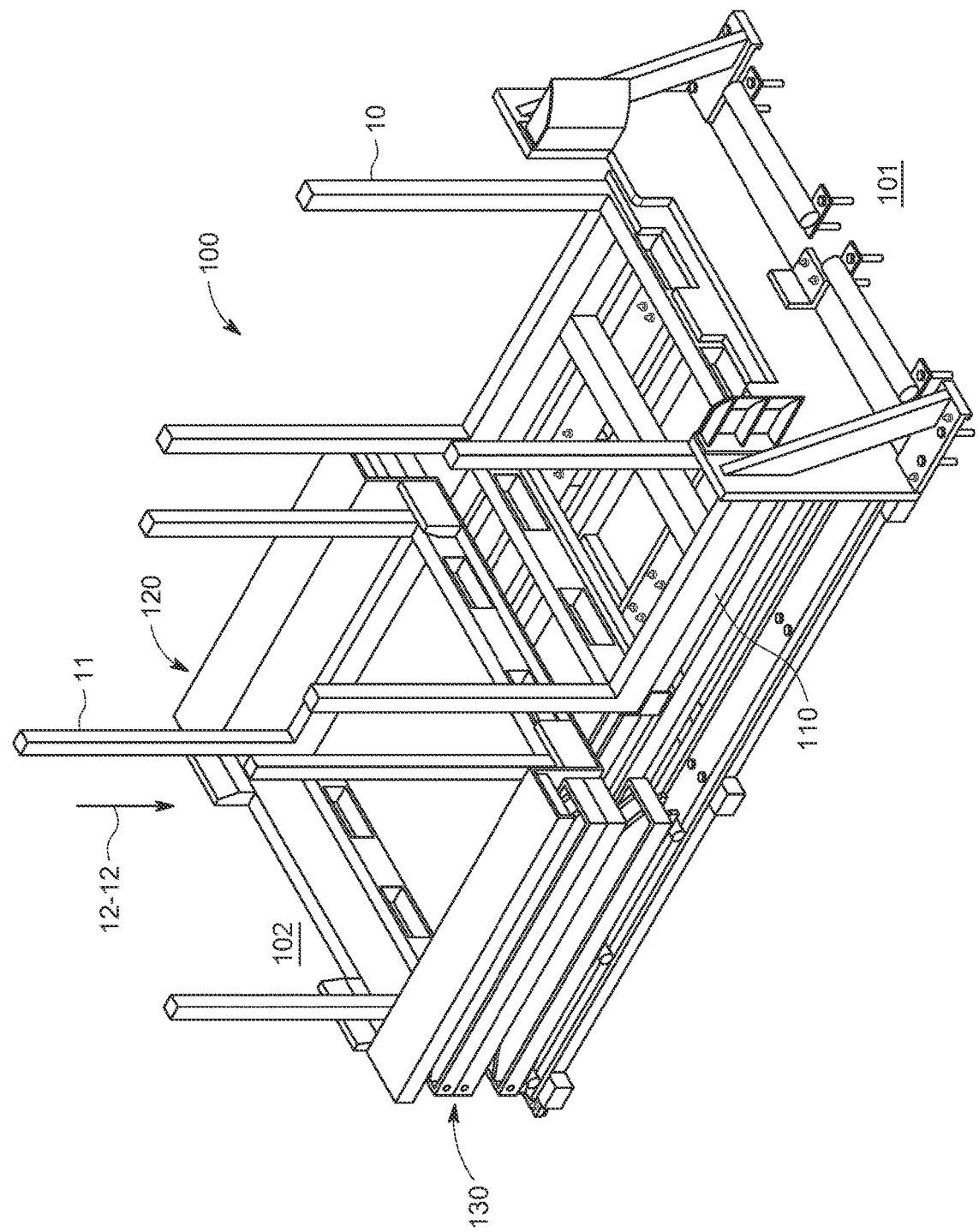
FIG. 12 shows the cart or rack loader/unloader and switcher of FIG. 11 with the second transfer carriage lowered by the travel lift mechanism to a lower position to provide access to the rack for an operator at the operator line side or station.

According to an exemplary implementation, each scissor lift mechanism 170, 172 comprises two scissor lift mechanisms in a vertical or stacked configuration. As shown in FIG. 5, the scissor lift mechanism 170 comprises a lower scissor lift mechanism indicated by reference 180 and an upper scissor lift mechanism indicated by reference 181. The configuration of the two scissor lift mechanisms 180, 181 provides the lift mechanism with a greater range of vertical movement within a narrower horizontal footprint or template. The lower scissor lift mechanism 180 comprises the base 174 which is coupled to the rail(s) 144a as described above. The upper scissor lift mechanism 181 comprises the upper shelf or support section 178 which is connected to the second transfer carriage 120. The scissor lift mechanisms 180 and 181 are coupled together and are configured with individual drive lift mechanisms or a single drive mechanism for the scissor lift mechanism 170. The drive lift mechanism may comprise a hydraulic actuator configured to open/close, i.e. extend and retract, the scissor lift mechanism 170 to raise and lower the second transfer carriage 120 under the control of the controller 160 as described in more detail herein. Similarly, the scissor lift mechanism 172 comprises a lower scissor lift mechanism indicated by reference 182 and an upper scissor lift mechanism indicated by reference 183. The lower scissor lift mechanism 182 comprises the base 176 which is coupled to the rail(s) 144b as described above. The upper scissor lift mechanism 183 comprises the upper shelf or support section 179 which is connected to the second transfer carriage 120. The scissor lift mechanisms 182 and 183 are coupled together and are configured with individual drive lift mechanisms or a single drive lift mechanism for the scissor lift mechanism 172 in a manner similar to the scissor lift mechanism 172. Then as shown in FIG. 11, the elevated second transfer carriage 120 and loaded rack 11 is moved by the travel lift mechanism 130 to the operator side 102, as indicated by arrow 11-11. As shown in FIG. 12 and indicated by arrow 12-12, the second transfer carriage 120 is lowered by the lift mechanism 130, and the loaded rack 11 is accessed at the operator side 102 by an assembly line worker.

Reference is next made to FIGS. 13A to 13J which shows a sequence of operations for a rack loader/unloader and switcher system according to an embodiment of the invention and indicated generally by reference 1300. The rack loader/unloader and switcher system 1300 may be implemented in a manner similar to the rack loader/unloader and switcher system 100 described above and comprises a first transfer carriage indicated by reference 1310 and a second transfer carriage 1320 with a lift mechanism indicated by reference 1322.

Figure 13A:
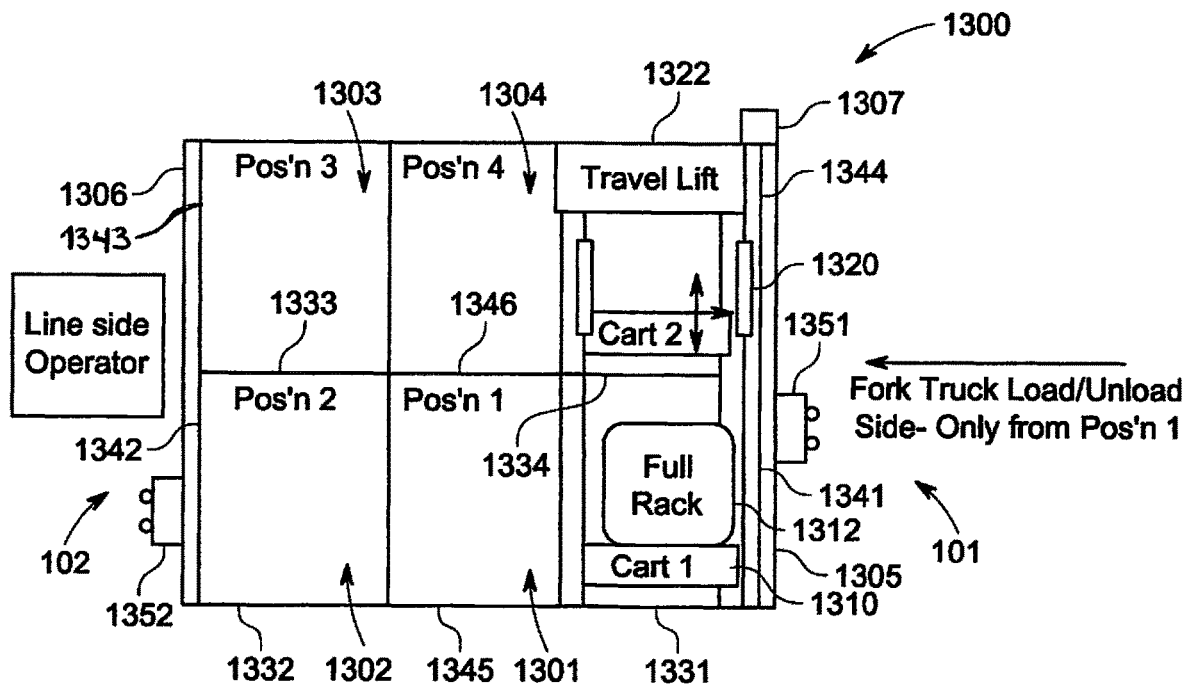
FIG. 13A shows an exemplary sequence of operations for the rack loading and switcher system with a first loaded rack in "Position 1"

As shown in FIG. 13A, the rack loader/unloader and switcher 1300 comprises a loading station or side indicated by reference 101 and an operator or line side indicated by reference 102. The loading station or side 101 is configured for loading and unloading a rack 1312, comprising, for example, a bin, rack, or pallet, loaded with materials, parts or other components, required at the operator side, e.g. an assembly worker at a station on an automobile assembly. The cart(s) are loaded/unloaded at the loading station 101 using a forklift, other lifting and transport mechanism or machine.

As shown in FIG. 13A, the rack loader/unloader and switcher system 1300 is configured to operate in four positions or states comprising "Position 1" indicated by reference 1301, "Position 2" indicated by reference 1302, "Position 3" indicated by reference 1303, and "Position 4" indicated by reference 1304. The first transfer carriage 1310 is configured to move between Position 1 and Position 2, for example, along a pair of rails or tracks with an actuator, e.g. a motor and/or drive shaft, or a hydraulic drive shaft, similar to the implementation described above. The switcher system 1300 includes a controller, e.g. the controller 160 comprising a programmable device (or relay logic controller or board), configured to control and monitor the components and elements in the operation of the system as described herein. The particular implementation details the controller 160 are described in more detail below and also will be readily within the understanding of those skilled in the art.

Referring again to FIG. 13A, the rack loader/unloader and switcher system 1300 may further include one or more safety sensors or devices or relay logic sensor and/or output devices According to an exemplary, the rack loader/unloader and switcher 1300 comprises a loading side safety sensor indicated by reference 1305 and an operator side safety sensor indicated by reference 1306. The loading side safety sensor 1305 is implemented as a "light curtain", for instance, comprising an LED and photosensor array configured with circuitry or logic control to generate an alarm. Similarly, the operator or line side safety sensor 1306 is also implemented as a light curtain configured to generate an alarm. According to an exemplary implementation and embodiment, the loading side safety sensor 1305 is configured to generate an alarm and a cycle-stop condition if the light curtain 1305 is breached during any movement of the first transfer carriage 1310, and/or the second transfer carriage 1320, and/or the lift mechanism 1322. Similarly, the operator side safety sensor 1306 is configured to generate an alarm and a cycle-stop condition if the light curtain 1306 is breached during any movement of the first transfer carriage 1310, and/or the second transfer carriage 1320, and/or the lift mechanism 1322. According to another aspect, the rack loader/unloader and switcher system 1300 includes a safety light indicator 1307, for example, a fork light beacon, which is mounted in a visible location at the loading station or side 101. According to an exemplary implementation, the safety light indicator 1307 is configured to illuminate green for a "Clear to Enter" state when it is safe for a fork lift operator to load/unload a cart or rack from the switcher 1300; and to illuminate red for "Not Clear to Enter" state to indicate that it is not safe for a fork lift driver to load/unload a cart or rack. According to another aspect, the safety light indicator is configured to flash green and red to indicate that the loading side, i.e. the fork-lift side, light curtain 1305 has been breached (for instance as described above). According to another aspect, the safety light indicator 1307 is configured to illuminate white to indicate a "Rack Loaded Correctly" state when the cart or rack is properly loaded on the transfer carriage 1310 or 1320.

An exemplary sequence of operations a load and unload cycle is now described with reference to FIGS. 13A to 13J.

As shown in FIG. 13A, the safety light or beacon 1307 is configured to show Green indicating "Clear to Enter" condition for the fork-lift operator. The first transfer carriage 1310 is located at "Position-1" indicated by reference 1301. The fork-lift (or other loading machine or mechanism) loads a bin or rack (full of parts or components) on the first transfer carriage 1310 located at "Position-1" 1301. The switcher system 1300 may include a "Position-1" detect or proximity sensor, or relay logic sensor, indicated by reference 1331 configured to detect when the transfer carriage 1310 or 1320 is properly positioned or seated in Position-1 in the switcher 1300. As shown, the second transfer carriage 1320 and the lift mechanism 1322 are positioned or moved to Position-4 as indicated by reference 1304. In Position-4, the lift mechanism 1322 is extended to position the second transfer carriage 1320 above the first transfer carriage 1310, which as will be described in more detail below allows the first transfer carriage 1310 to effectively move from Position-1 1301 to Position-2 1302 under the second transfer carriage 1320. The switcher system 1300 may include a Position-3 detect sensor (or using a relay logic sensor) indicated by reference 1333 configured to detect when the second transfer carriage 1320 is properly positioned or seated in Position-3 in the switcher 1300.

Referring still to FIG. 13A, the switcher 1300 may include a Position-4 detect or proximity sensor (or relay logic sensor or output device) indicated by reference 1334 configured to detect when the transfer carriage 1310 or 1320 is properly positioned or seated in "Position-4" 1304. The switcher 1300 may further include "slow-down" sensors (or relay logic sensors or output devices) comprising a Position-1 slow-down sensor 1341, a Position-2 slow-down sensor 1342, a Position-3 slow-down sensor 1343 and/or a Position-4 slow-down sensor 1344. The slow-down sensors 1341-1344 are configured to sense the moving speed of the respective transfer carriage 1310, 1320 as the respective transfer carriage 1310 or 1320 moves from one operating position to another operating position in the switcher 1300 and provide or generate associated output signals or data for the controller. If the moving speed exceeds a pre-determined threshold, the controller is configured to control the drive or motor to appropriately reduce the speed to a safe speed or range of speeds.

Figure 13B:
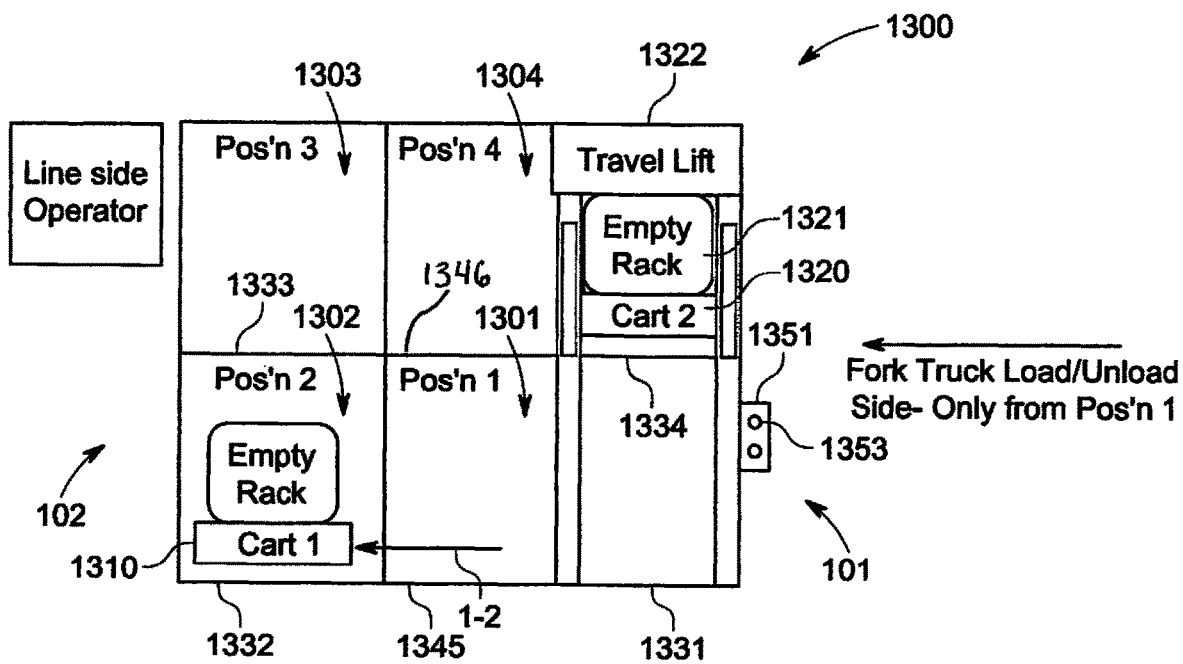
FIG. 13B shows the exemplary sequence of operations for the rack loading and switcher system with the first rack moved to "Position 2"

As shown in FIG. 13B, the first transfer carriage 1310 and the loaded bin or rack 1312 are moved by the motor or drive mechanism from "Position-1" 1301 to "Position-2" 1302 at the operator or line side 102 of the switcher system 1300, as further indicated by arrow 1-2. According to an exemplary implementation, the switcher system 1300 comprises a loading side control panel 1351 configured with a "Reset Load Light Curtain" button 1353, which is pressed by the fork-lift operator to initiate movement of the transfer carriage 1310 by the drive mechanism. The Position-2 detect or proximity sensor (an electronic sensor or a relay logic sensor or output device) 1332 detects when the transfer carriage 1310 and the full rack 1312 are properly positioned, and disable the line side safety or light curtain 1306 to allow the operator, e.g. assembly line worker, to access, e.g. pick parts off, the rack or bin 1312 on the transfer carriage 1310. The switcher 1300 may include a slow-down sensor 1345 (an electronic sensor device or a relay logic device) which is configured to monitor the moving speed of the transfer carriage 1310, 1320 between "Position-1" 1301 and "Position-2" 1302 as indicated by arrow 1-2, and reduce speed if a pre-determined threshold is exceeded, in a manner similar to that described above.

Figure 13C:
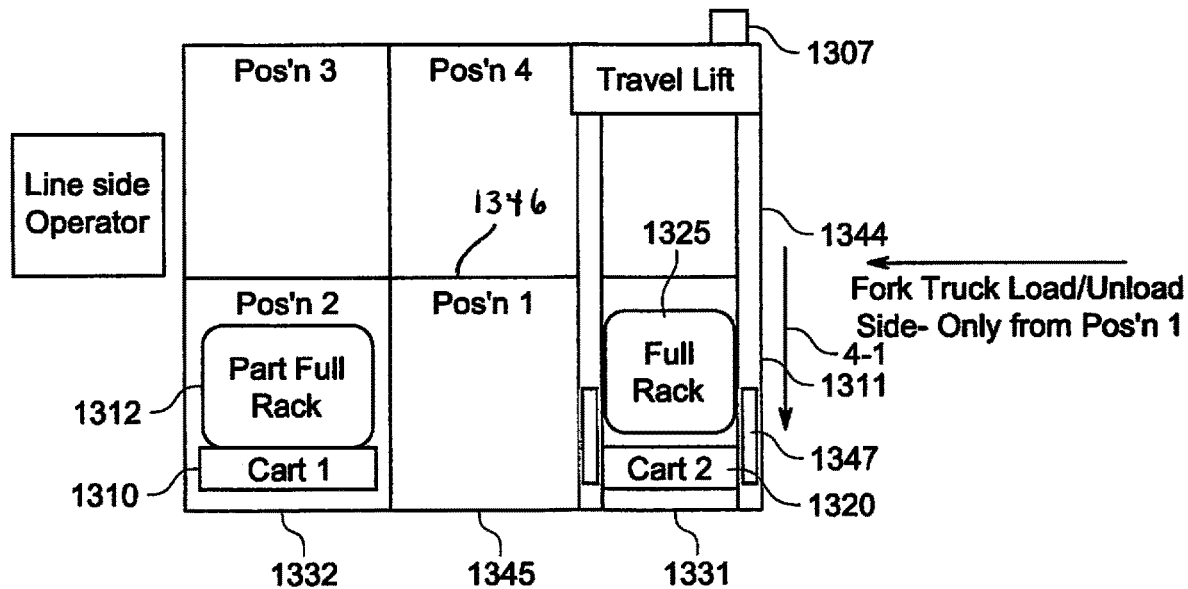
FIG. 13C shows the exemplary sequence of operations for the rack loading and switcher system with a loaded second rack moved or loaded into "Position 1"

Referring next to FIG. 13C, which shows the second transfer carriage 1320 lowered by the travel lift 1322 from "Position-4" 1304 to "Position-1" 1301 as indicated by arrow 4-1 for loading with a full or loaded rack or bin, indicated by reference 1325. The safety beacon 1307 is illuminated under the control of the controller 160 to indicate the "Clear to Enter" condition or state for the forklift truck/driver. The forklift driver loads the second full rack or bin 1325 on the second transfer carriage 1320 as shown. The switcher system 1300 may include additional loading or proximity sensor(s) (e.g. electronic sensor devices or relay logic sensor or output devices) to generate an output, e.g. signal, for the controller 160 indicating that the rack or bin 1325 (and bin 1312) is properly loaded or positioned on the second transfer carriage 1320 (or the first transfer carriage 1310). In the response, the controller 160 activates the safety beacon 1307 to indicate the "Rack Loaded Correctly" state for the forklift driver or other operator. The movement and position of the second transfer carriage 1320 is monitored by the sensors 1341 and 1344.

Figure 13D:
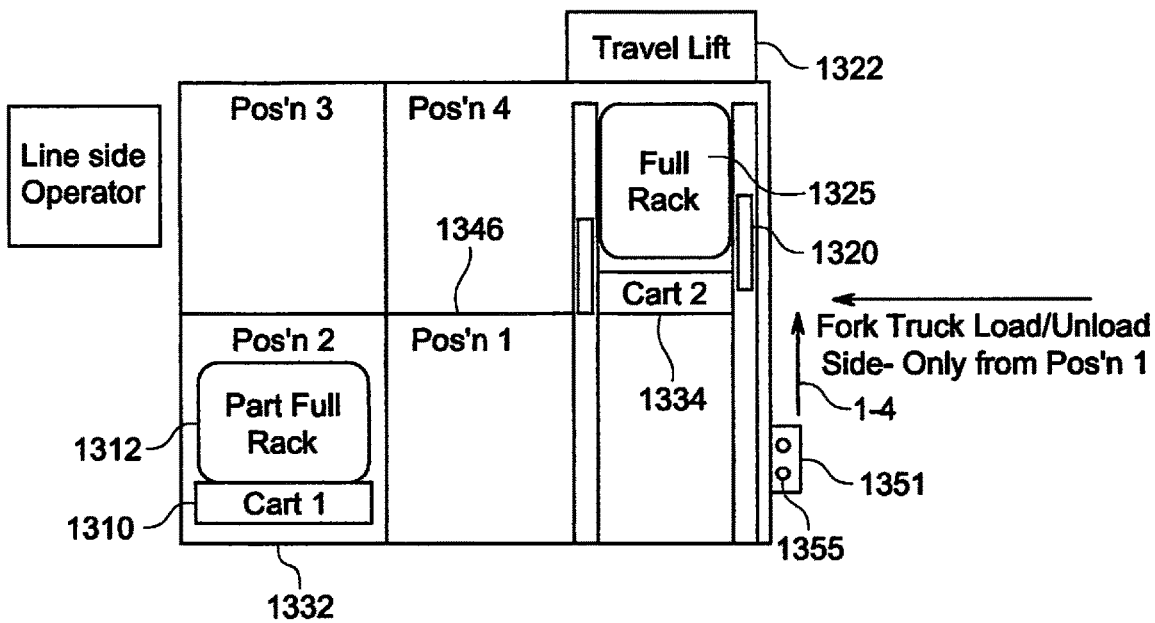
FIG. 13D shows the exemplary sequence of operations for the rack loading and switcher system with the loaded second rack moved to "Position 2"

Reference is next made to FIG. 13D, which shows the switcher system 1300 moving the second transfer carriage 1320 with the full or loaded bin 1325 after being loaded from "Position-1" 1301 to "Position-4" 1304. With the safety beacon 1307 showing the "Rack Loaded Correctly" state (FIG. 13C), the forklift driver or another operator presses "Reset Load Light Curtain" 1355 on the loading side control panel 1351, and the controller operates or actuates the travel lift mechanism 1322 to move the second transfer carriage 1320 with the loaded bin 1325 to "Position-4" 1304 as indicated by arrow 1-4 in FIG. 13D.

Figure 13E:
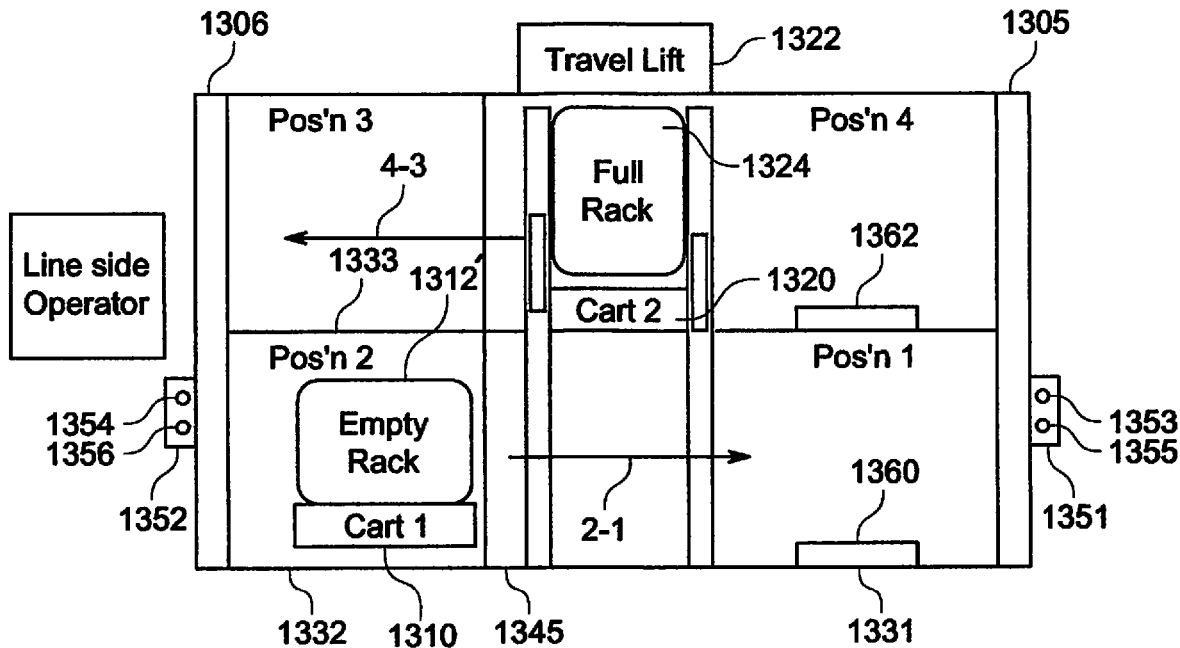
FIG. 13E shows the exemplary sequence of operations for the rack loading and switcher system with the empty first rack being moved back to "Position 1" and the loaded second rack being moved to a "Position 3" in the switcher system.
Figure 13F:
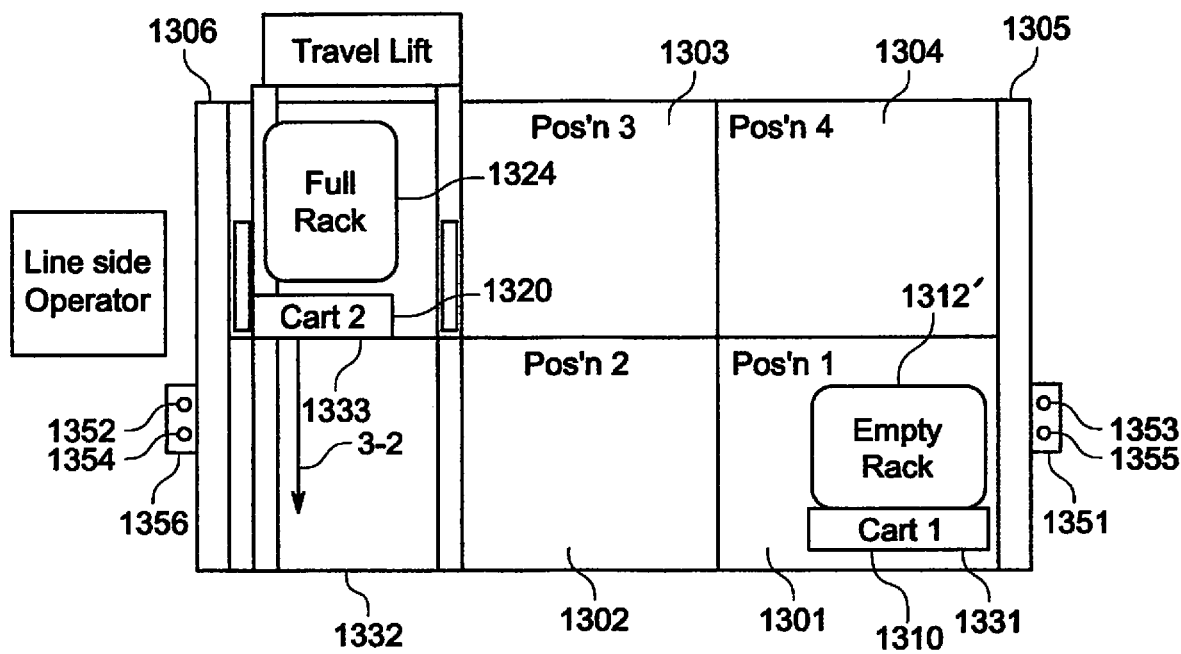
FIG. 13F shows the exemplary sequence of operations for the rack loading and switcher system with the empty first rack moved back to "Position 1" and the loaded second rack being moved from Position 3 to Position 2.

Reference is next made to FIG. 13E, which depict the sequential movement, or substantially simultaneous movement, of the first transfer carriage 1310 from "Position-2" 1302 back to "Position-1" 1301 and the second transfer carriage 1320 from "Position-4" 1304 to "Position-3" 1303, and then from "Position-3" 1303 to "Position-2" 1302 as depicted in FIG. 13F. As shown, the switcher system 1300 is configured with a first or lower drive mechanism unit indicated generally by reference 1360 and a second or upper drive mechanism or unit indicated generally by reference 1362. The lower drive unit 1360 is configured to move the first transfer carriage 1310 back and forth between "Position-1" 1301 and "Position-2" 1302 as indicated by arrows 1-2, 2-1. Similarly, the upper drive unit 1362 is configured to move the second transfer carriage 1320 and the travel lift mechanism 1322 back and forth between "Position-3" 1303 and "Position-4" 1304 as indicated by arrows 3-4, 4-3. The drive units 1360, 1362 may be implemented in known manner, for instance, utilizing a hydraulic mechanism or actuator, or a belt drive and motor unit, or a motor and worm-gear drive unit.

Referring still to FIG. 13E, the lineside operator clears the Lineside Operator Light Curtain 1306 and then presses an "Operator Light Curtain Tripped" button 1354 on the lineside operator panel 1352 and then a "Cycle Start Button" 1356 on the lineside operator panel 1352. In response to signal(s) or data inputs from the lineside operator panel 1352, the controller 160 is configured to control the lower drive unit 1360 to move the first transfer carriage 1310 with an empty rack or bin indicated by reference 1312' from "Position-2" 1302 back to "Position-1" 1301 as indicated by arrow 2-1, i.e. a reverse direction. Similarly, the controller 160 is configured to control the upper drive unit 1362 to move the second transfer carriage 1320 with a full rack or bin indicated by reference 1324 from "Position-4" 1304 to "Position-3" 1303 as indicated by arrow 4-3, i.e. a forward direction. The controller 160 can be configured to move the first transfer carriage 1310 and the second transfer carriage 1320 substantially simultaneously, or in the alternative, sequentially. As further shown in FIG. 13F, once the controller 160 detects that the second transfer carriage 1320 is properly located or situated in "Position-3" 1303, i.e. via an output signal or data from the Position-3 location sensor 1333 (and the first transfer carriage 1310 has been moved from Position-2 1302, i.e. via an appropriate output signal from the location sensor 1332), the controller 160 actuates the transfer lift mechanism 1322 to lower the second transfer carriage 1320 with the full rack or bin 1324 from "Position-3" 1303 to "Position-2" 1302 as indicated by arrow 3-2 in FIG. 13F. On the Load/Unload side 101, the first transfer carriage 1310 with the empty bin or rack 1312' is in position for unloading, and the controller 160 activates the safety beacon 1307 to indicate the "Clear to Enter" state for example by illuminating a green light. The forklift driver or operator is free to remove the empty rack 1312' from the first transfer carriage 1310.

Figure 13G:
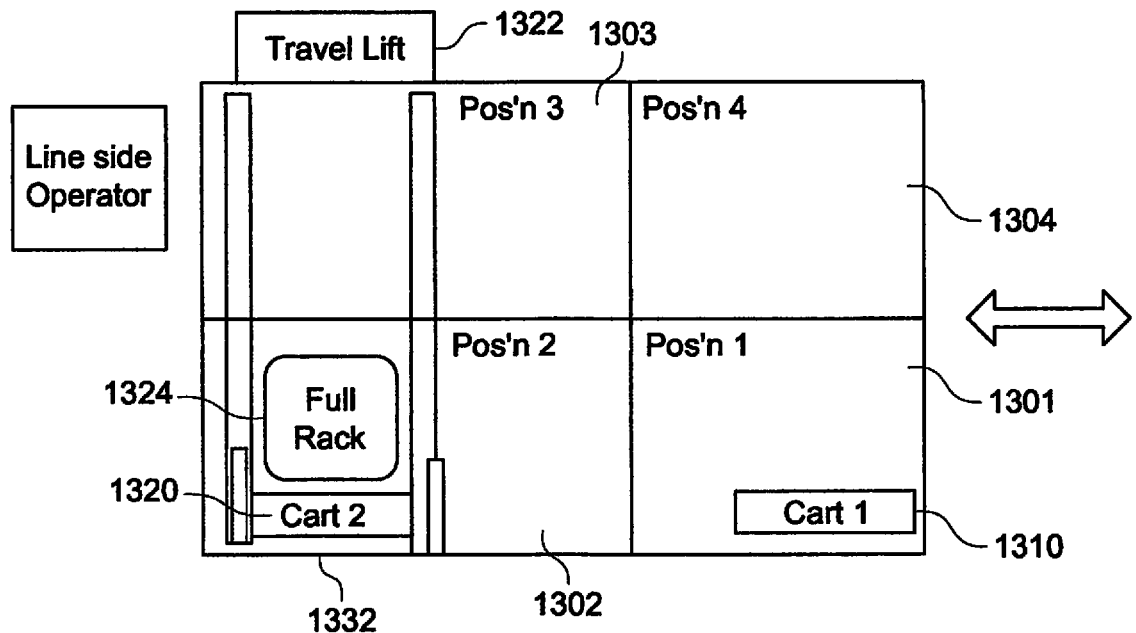
FIG. 13G shows the exemplary sequence of operations for the rack loading and switcher system with the empty first rack removed or unloaded from "Position 1" and the loaded second rack moved to Position 2 and ready for unloading or access at the line side operator.
Figure 13H:
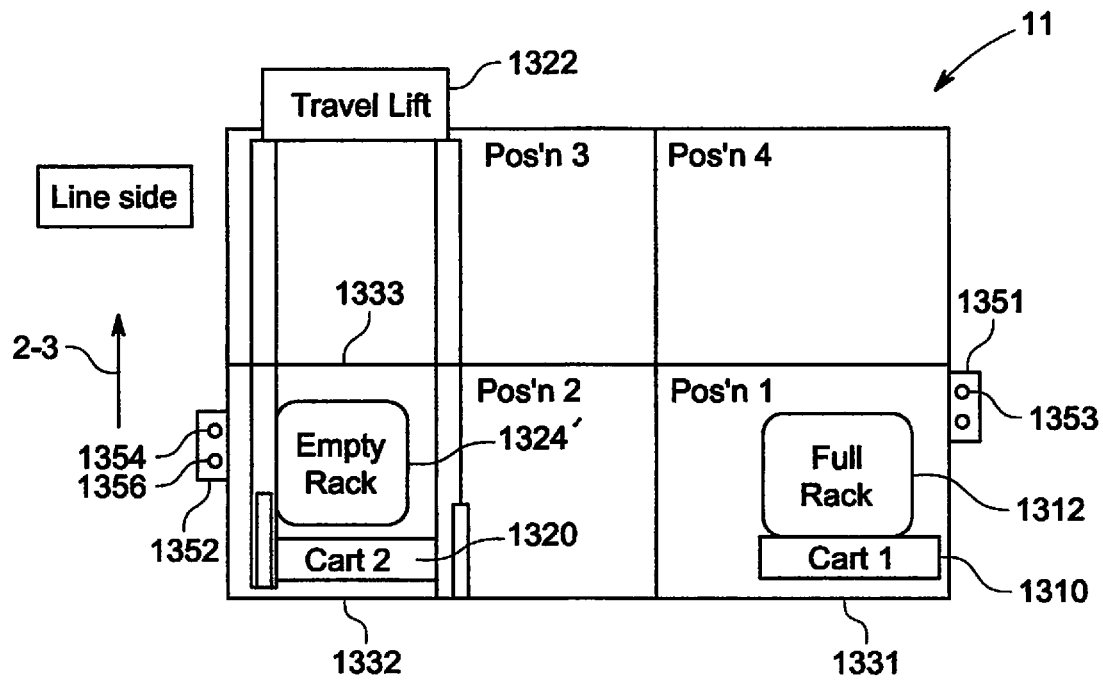
FIG. 13H shows the exemplary sequence of operations for the rack loading and switcher system with the empty second rack being moved back to "Position 3" and the loaded second rack being moved from Position 1 to Position 2.
Figure 13I:
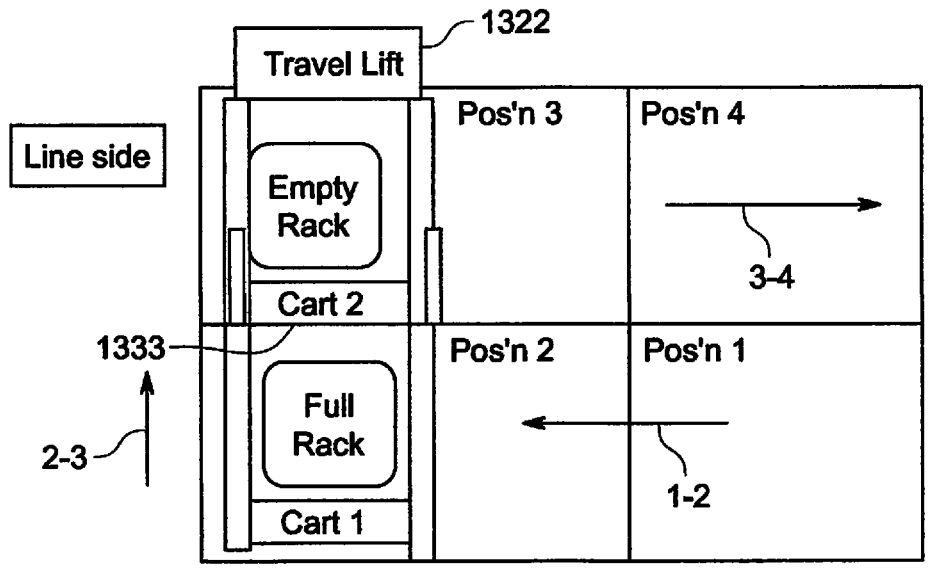
FIG. 13I shows the exemplary sequence of operations for the rack loading and switcher system with the empty rack raised and moved to "Position-3" and the second full rack moved from Position-1 to Position-2 and located underneath the empty rack in Position-3.
Figure 13J:
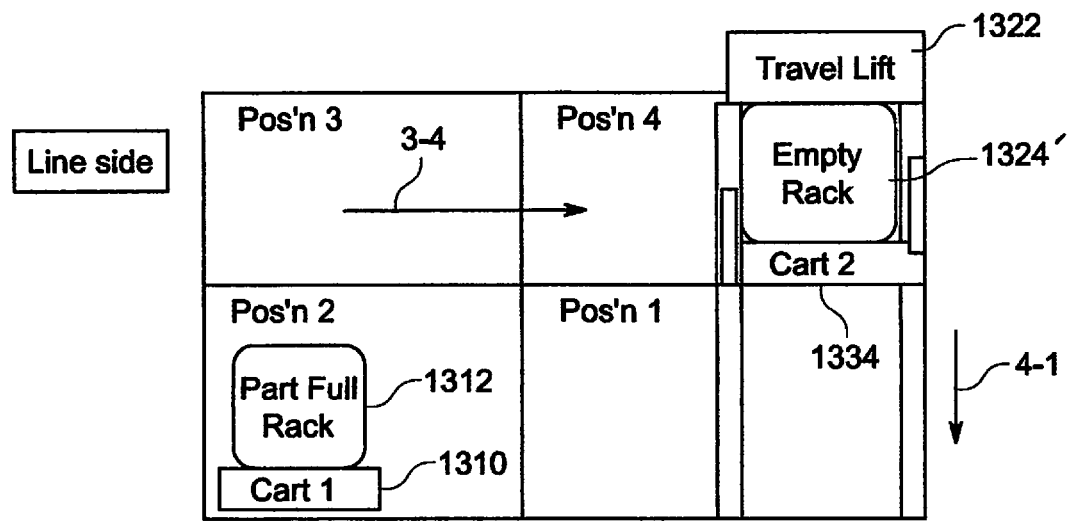
FIG. 13J shows the exemplary sequence of operations for the rack loading and switcher system with the empty second rack being moved back, i.e. lowered, to "Position 1" from "Position 4" and the loaded first rack moved from Position 2 and ready for unloading or access at the line side operator.

Reference is next made to FIG. 13G. With the second transfer carriage 1320 and new full rack or bin 1324 located at "Position-2" 1302, the lineside operator is free to pick or pull the full rack 1324 on the transfer carriage 1320. As shown in FIG. 13H, a new full rack or bin 1312 is loaded onto the first transfer carriage 1310 in "Position-1" 1301 by the forklift driver or operator, and the driver or an operator presses the "Reset Load Light Curtain" button 1353 on the panel 1351 at the "load side" 101.

Referring still to FIG. 13H, the lineside operator initiates a new cycle, e.g. calling for a new rack or bin, by pressing the "Reset Load Light Curtain" button 1354 and then the "Operator Cycle Start" button 1356 on the lineside operator panel 1352. In response to the output signal(s) from operator panel 1352, the controller 160 actuates the travel lift mechanism 1322 to raise the second transfer carriage 1320 and the empty rack indicated by reference 1324' from "Position-2" 1302 to "Position-3" 1303 as shown in FIG. 13H and indicated by arrow 2-3. Once the second transfer carriage 1320 and the empty rack 1324' are moved to "Position-3" 1303 as determined or verified by an output signal from the position location sensor 1333, the controller 160 actuates the upper drive unit 1362 to move (i.e. in reverse) the second transfer carriage 1320 with the empty rack 1324' (and the travel lift mechanism 1322) from "Position-3" 1303 to "Position-4" 1304 as indicated by arrow 3-4 in FIG. 13I. Simultaneously, or sequentially (as described above), the controller 160 actuates the first drive mechanism or lower drive unit 1360 to move the first transfer carriage 1310 with the new loaded rack 1312 from "Position-1" 1301 to "Position-2" 1301 as indicated by arrow 1-2 in FIG. 13I. As further shown in FIG. 13J, once the second transfer carriage 1320 with the empty rack 1324' is positioned or located in "Position-4", for instance as verified by the position location sensor 1334, the controller 160 actuates the travel lift mechanism 1322 to lower the second transfer carriage 1320 and the empty rack 1324' from "Position-4 " 1304 to "Position-1" 1301 as indicated by arrow 4-1 in FIG. 13J, for subsequent unloading and then reloading a new rack as described above.

According to another aspect and embodiment, the cart loader/unloader and switcher system 1300 may be configured to operate in a bypass lift mode, for example, implemented in a control module or logic circuit in the controller 160, e.g. a microcontroller or processor, operating under stored program control, or a logic circuit, or other type of programmable control device or circuit, or a relay logic controller or system. According to an exemplary implementation, the bypass lift mode is triggered if the operator side safety sensor 1306, i.e. light curtain, is breached. In bypass lift mode, the switcher system 1300 is configured to allow the transfer lift mechanism 1322 to move between "Position 1" 1301 and "Position 4" 1304 if the first transfer carriage 1310 is located at the operator side 102 and the lift mechanism 1322 is located or positioned at the forklift loading/unloading side 101.

Reference is next made to FIG. 14, which shows an exemplary implementation for the controller 160 and indicated generally by reference 1400. The controller 1400 is implemented and configured to execute and/or control the functionality and features of the embodiments of the switcher system 100, 1300 as described herein. The controller 1400 is implemented in a hardware-based configuration and comprises a processor 1401, a main memory 1402, a read only memory or ROM 1404, a storage device 1406, an input device interface 1420, and an output device interface 1430. According to an exemplary implementation as described above, the controller 1400 also includes a device interface 1440 for the safety light or bean 1307 (FIG. 13A). The controller 1400 may also include a communication interface for interfacing to a central plant computer or control system. The hardware components may be coupled utilizing a bus and/or an input/output port configuration.

According to the embodiments of the switcher system 100, 1300 as described above, the input device interface 1420 comprises an interface configured to couple to the proximity or location sensors (e.g. electronic sensors and/or relay logic devices), i.e. "Position-1" detect sensor 1331 (FIG. 13A), "Position-2" detect sensor 1332 (FIG. 13A), "Position-3" detect sensor 1333 (FIG. 13A), and "Position-4" detect sensor 1334 (FIG. 13A), and the slow-down sensors, comprising the "Position-1" slow-down sensor 1341 (FIG. 13A), "Position-2" slow-down sensor 1342 (FIG. 13A), "Position-3" slow-down sensor 1343 (FIG. 13A), "Position-4" slow-down sensor 1344 (FIG. 13A), and the horizontal slow-down sensors comprising the "Position-1" slow-down sensor 1345 (FIG. 13A) and "Position-4" slow-down sensor 1346 (FIG. 13A). The input device interface 1420 also includes an interface configured to couple to the load side 1305 and the operator side 1306 safety or light curtains (FIG. 13A) and the loading side control panel 1351 (FIG. 13A) and the lineside operator control panel 1352 (FIG. 13A). The controller 1400 is configured to receive and process output signals from these sensors and control the speed and/or positional movement of the first transfer carriage 1310, and/or the second transfer carriage 1320 and the travel lift mechanism 1322.

According to the embodiments of the switcher system 100, 1300 as described above, the output device interface 1430 comprises an interface configured to couple and control the drive mechanism for the first transfer carriage 150 (FIG. 1), the drive mechanism for the travel lift mechanism 152 (FIG. 1), and the lift drive mechanism(s) for the scissor lift mechanisms 170, 172 (FIG. 5).

According to the embodiment of the switch system 1300, the output device interface 1430 couples the controller 1400 to the safety light or beacon 1307 (FIG. 13A). The controller 1400 is configured to control the illumination states of the safety light 1307.

As will readily understood by those skilled in the art, the processor 1401 may comprise a computer, a microprocessor, a microcontroller or other type of hardware-based processing device or logic board or circuit board or programmable logic array that is configured to interpret inputs and data and/or execute instructions to perform the functional operations, the control functions, the monitoring operations and other functions associated with the operation of the switcher system as described herein. The main memory 1402 may comprise a random access memory (RAM) or other types of dynamic storage device that is configured to store information and/or instructions for execution by the processor 1401. The ROM 1404 may comprise a conventional ROM device or another type of static or non-volatile storage device configured to store static information and/or instructions for use by the processor 1401. The storage device 1406 may comprise a mass storage device for storing or archiving operational data and other information.

The particular implementation details associated with the hardware and/or software components comprising the controller 1400 will readily be within the understanding of those skilled in the art of digital and/or analog hardware design, logic and logic relay design, and computer programming in high level programming languages and/or firmware design.

Figure 15A:
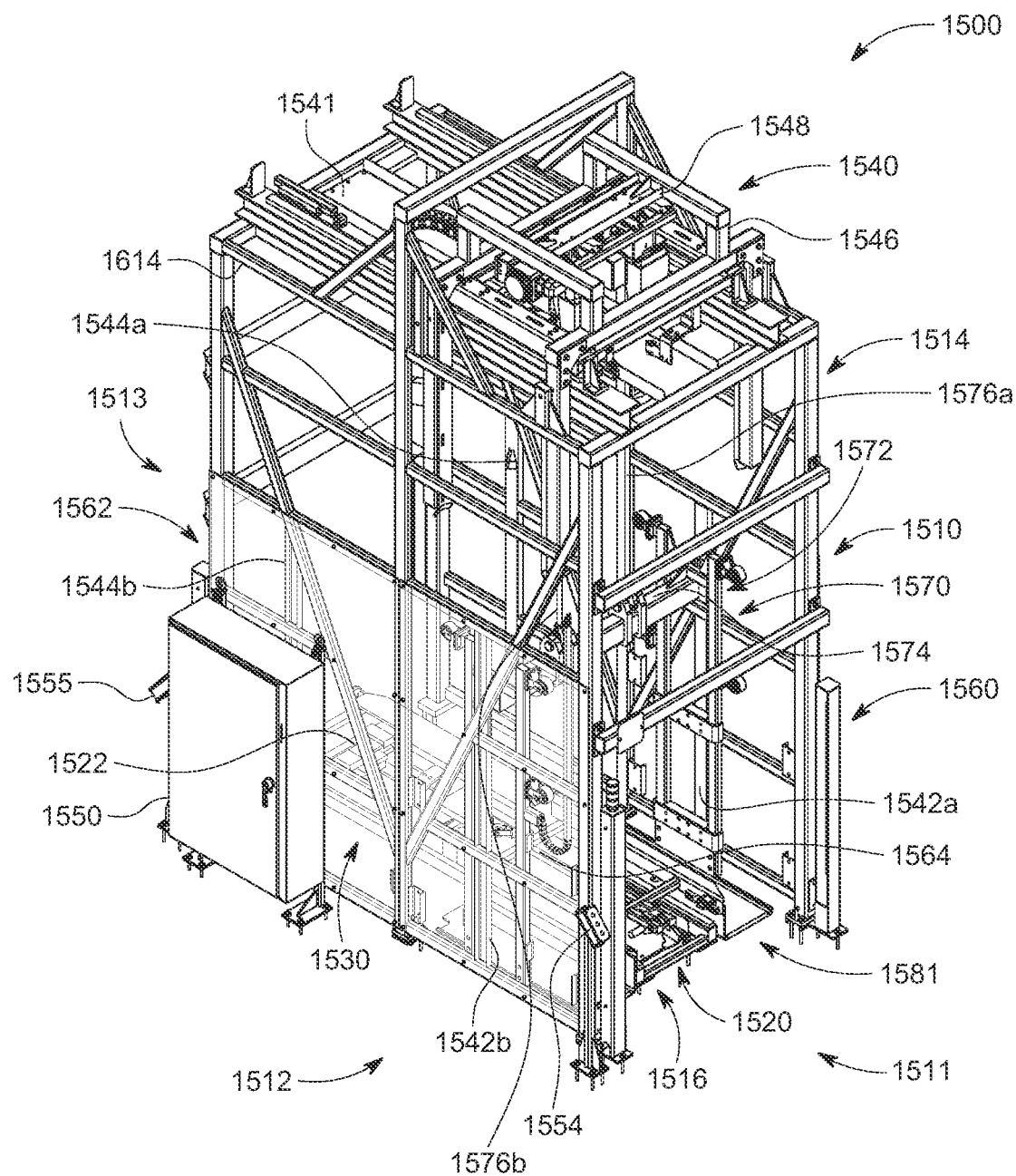
FIG. 15A shows in diagrammatic form a cart or rack loader/unloader and switcher system according to another embodiment of the present invention with a rack or bin ready for loading at a loading stage or side.
Figure 15B:
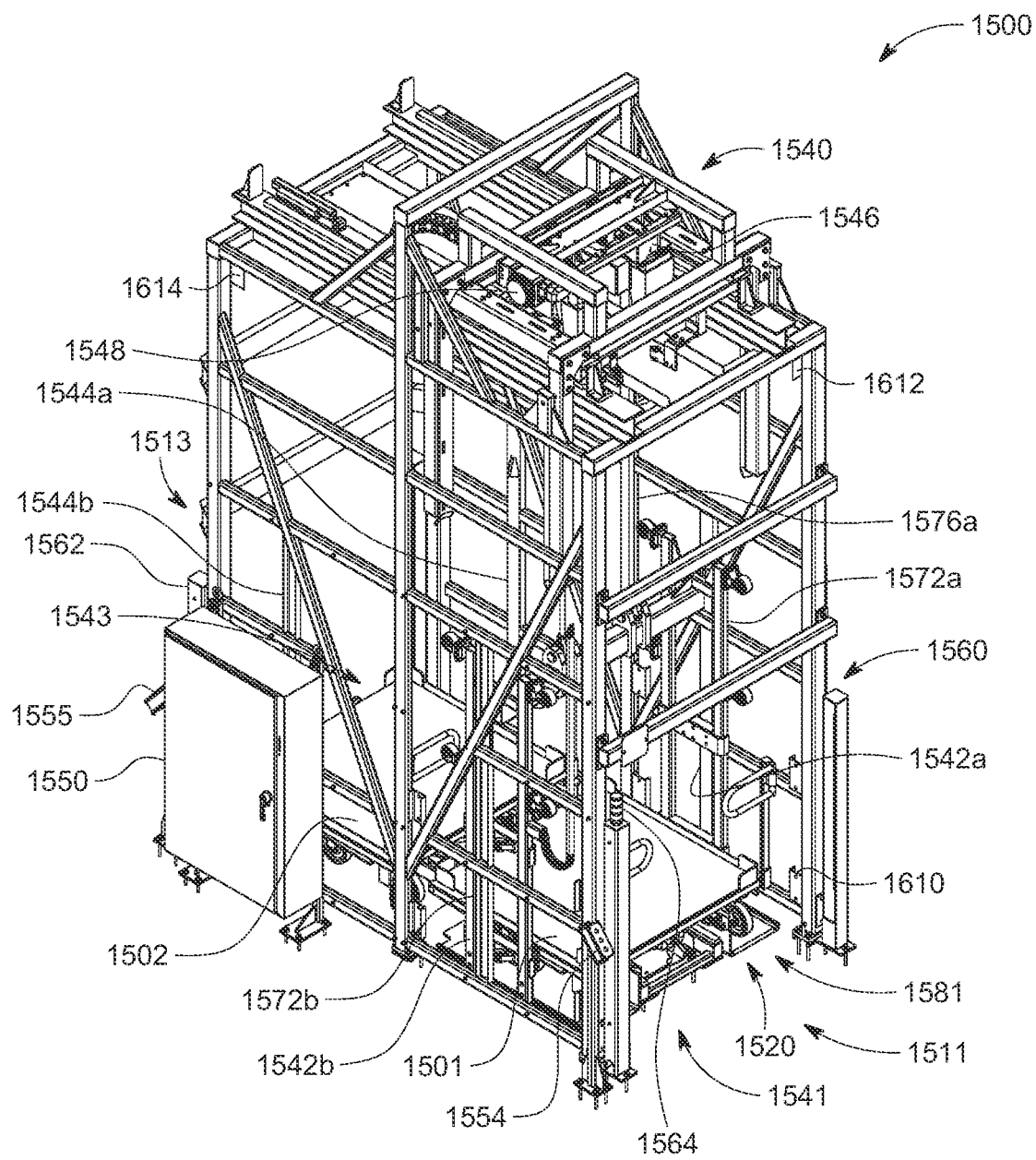
FIG. 15B shows in diagrammatic form the cart or rack loader/unloader and switcher system of FIG. 15A configured with a first rack or cart in a first transfer carriage and a second rack or cart in a second transfer carriage.

Reference is next made to FIGS. 15A and 15B, which shows a rack or bin cart loader/unloader and switcher system according to another embodiment of the present invention and indicated generally by reference 1500. In accordance with the embodiment, the rack loader/unloader and switcher system 1500 comprises a support frame 1510, a first transfer carriage 1520, a second transfer carriage 1530, and a travel lift mechanism 1540. The frame 1510 comprises a lower frame section indicated generally by reference 1512 and an upper frame section indicated generally by reference 1514. The frame 1510 comprises a load side indicated by reference 1511 and an operator side indicated by reference 1513. The load side 1511 is typically configured for loading bins or racks filled with parts, components, materials, and unloading or removing the empty bins or racks, etc., for example using a forklift or other industrial lift or transport machine or mechanism. The loaded bins or racks are unloaded at the operator side 1513, for instance, an assembly line in a vehicle assembly or manufacturing facility. As will be described in more detail below, the loader/unloader and switcher system 1500 is configured to move and switch the loaded bins to the operator side 1513 and move the empty bins back to the load side 1511.

Referring to FIGS. 15A and 15B, the first transfer carriage 1520 is configured to move between the load side 1511 and the operator side 1513, e.g. in a horizontal direction or movement. The lower section 1512 of the frame 1510 comprises a track, rails or other guide mechanism indicated generally by reference 1516 and configured to couple and/or guide the second transfer carriage 1530 between the operator side 1513 and the load side 1511 for bidirectional movement or travel (as indicated by arrow 1592 in FIG. 16B). The first transfer carriage 1520 is coupled to and carried by the lift mechanism 1540. In an exemplary implementation, the support base includes one or more rails or tracks 1542 at the load side 1511, indicated individually by references 1542a and 1542b, for a dual rail or track arrangement, configured to support and/or guide the first transfer carriage 1520 between a loading/unloading position or stage indicated generally by reference 1541 at the load side 1511. Similarly at the operator side 1513, the support frame 1510 includes one or more rails or tracks 1544 at the operator side 1513, indicated individually by references 1544a and 1544b, for a dual rail or track arrangement, configured to support and/or guide the first transfer carriage 1520 between a loading/unloading position or stage indicated generally by reference 1543 at the operator side 1511. The rails or tracks 1542 and 1544 are configured to support and guide the lift mechanism 1540 up and down, e.g. in a vertical direction, and position the first transfer carriage 1520 (and the full/empty bin or rack) in a bypass position for moving between the loading/unloading stage 1511 and the operator side or line position 1513, as will be described in more detail below.

Figure 16A:
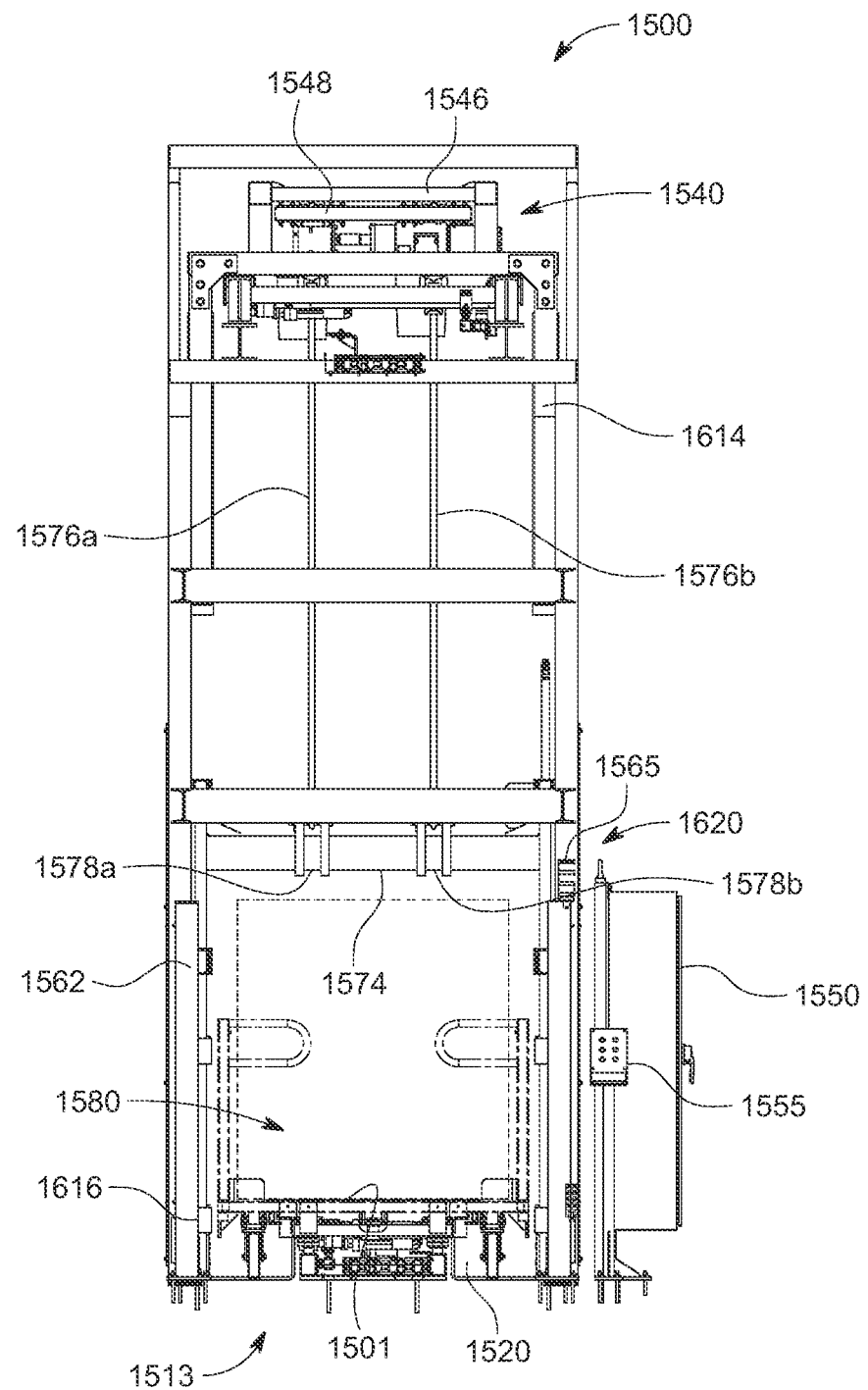
FIG. 16A shows in a diagrammatic form an end view from the load side of the cart or rack loader/unloader and switcher system with a loaded rack or cart on the second transfer carriage.

Referring to FIG. 15A, the switcher system 1500 includes a drive mechanism for the second transfer carriage 1530 indicated generally by reference 1522. According to an exemplary implementation, the drive mechanism 1522 comprises a "C/W Demag drive system" configured to move the second transfer carriage 1530 on the rails 1516 back and forth between the loading/unloading position at the load side 1511 and at the operator side position 1513. The drive mechanism 1522 may be implemented using other types of drive motors, belt drives, hydraulic actuator, or other types of actuators, for example, a motor and a worm-gear drive. Similarly, the switcher system 1500 includes a lift or vertical drive mechanism for the travel lift mechanism 1540 and indicated generally by reference 1546. The lift mechanism 1546 is configured to move the first transfer carriage 1520 in a vertical direction between a lowered position indicated by reference 1580 (as shown in FIG. 16A) and an elevated position 1582 (as shown in FIG. 16C). The travel lift mechanism 1540 includes another drive, i.e. travel, mechanism indicated generally by reference 1548 configured to move the first transfer carriage 1520 horizontally back and forth (in a raised or elevated position) between the loading/unloading end 1511 of the support frame 1500 and the operator side end 1513 of the support frame 1510. According to an exemplary implementation, the lift mechanism 1546 comprises a "Demag" Chain Hoist C/W Dual Chain unit or system configured to move the first transfer carriage 1520 in a generally vertically direction between up and down (i.e. lowered and raised) positions. According to an exemplary implementation, the drive mechanism 1548 comprises a C/W "Demag" drive system configured to move the first transfer carriage 1520 in a generally horizontal direction in the elevated or raised position between the load end 1511 and the operator end 1513. The lift mechanism 1546 and/or the drive mechanism 1548 may be implemented using other types of drive motors or actuators, for example, a hydraulic based system, a belt and motor drive, a motor and a worm-gear drive. The particular implementation details of the chain hoist for the lift 1546 and for the drive or travel mechanism 1548 will be within the understanding of those skilled in the art. In the context of the present description, the travel lift mechanism 1540 comprises the first transfer carriage 1520, the lift or vertical drive mechanism 1546 and the drive or travel, i.e. horizontal drive, mechanism 1548.

As also shown in FIGS. 15A and 15B, the rack loader/unloader and switcher system 1500 includes an electrical panel and control system indicated generally by reference 1550, and an first operator control panel 1554 and a second operator control panel 1555. The electrical panel and control system 1550 includes a controller comprising a programmable logic device, or a microprocessor-based device programmed to operate under stored-program control, for example as describe above, and configured to provide the functionality and operational control of the switcher system 1500 in a manner as described above. The first and second operator control panels 1554 and 1555 are operatively coupled to the controller in the electrical panel 1550 and configured to provide the functionality as described herein. The controller may be implemented with a configuration as shown in FIG. 14 and described above. According to another embodiment, or implementation, the controller comprises a relay logic system, e.g. a relay logic controller and/or relay logic board, coupled to the relay (switches and/or sensors or other compatible input devices) devices as described above the particular hardware implementation details, and/or software programming, and/or logic or relay logic function details, will be within the understanding of those skilled in the electronic hardware, logic control circuits, relay logic control, and programming arts.

As also shown in FIGS. 15A and 15B, the loader/unloader and switcher system 1500 includes safety devices or components comprising a load side light curtain 1560, an operator side light curtain 1562 and a safety light or lamp 1564. The loader/unloader and switcher system 1500 may further include position sensors indicated by references 1610, 1612, 1614 and 1616. The position sensors 1610, 1612, 1614 and 1616 are operatively coupled to the control panel 1550 and configured to track or monitor the position of the first transfer carriage 1520 and/or the second transfer carriage 1530, for example, in a manner similar to that described above. The position sensors may be implemented utilizing limit switches, or the like, which are operatively coupled to the control panel 1550 and generate output signal(s) which are inputted by the controller and under stored program control monitor and control the operation or movement of the first and second transfer carriages and the associated drive mechanisms. The load side light curtain 1560 is operatively coupled to the electrical panel and controller 1550 and configured to generate a "light curtain" for detecting the loading/unloading of a rack or bin into the loader/unloader and switcher system 1500. The load side light curtain 1560 may be further configured to detect the light curtain being "pierced" during one or more operating states of the switcher system 1500 and in response generate a warning, e.g. light and/or sound alarm, and/or a safety or emergency stop, for example, if an operator reaches, or a forklift moves, into the switch system 1500. The operator side light curtain 1562 at the operator side 1513 of the switcher system 1500 is configured to operate in a similar manner. According to an exemplary implementation, the safety lamp 1564 comprises a tricolour light configured to emit a solid or flashing red beam, green beam, or white beam, depending on the operating state of the switcher system 1500, as described herein.

Figure 16B:
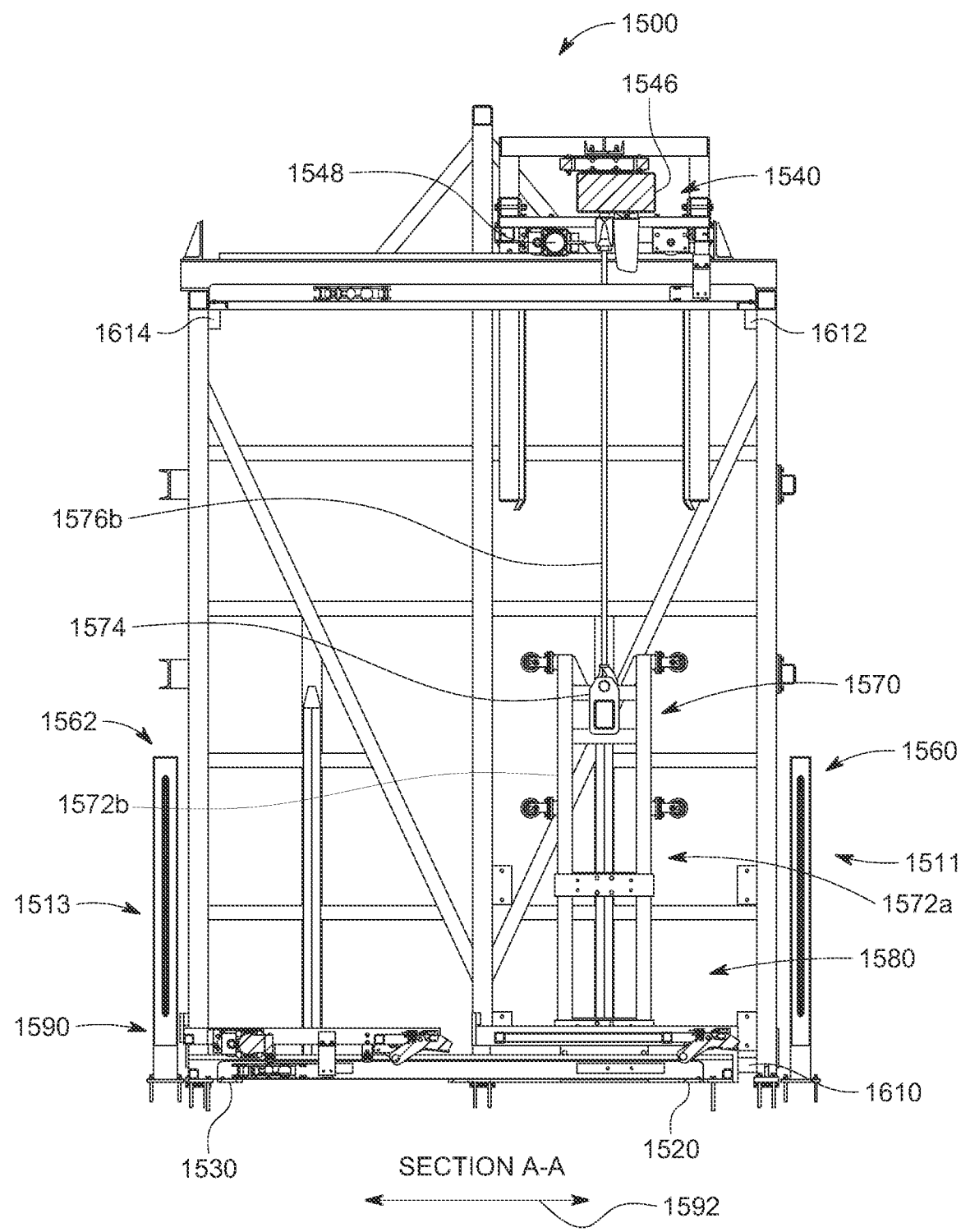
FIG. 16B shows in a diagrammatic form a sectional view of the cart or rack loader/unloader and switcher system taken along section line A-A.
Figure 16C:
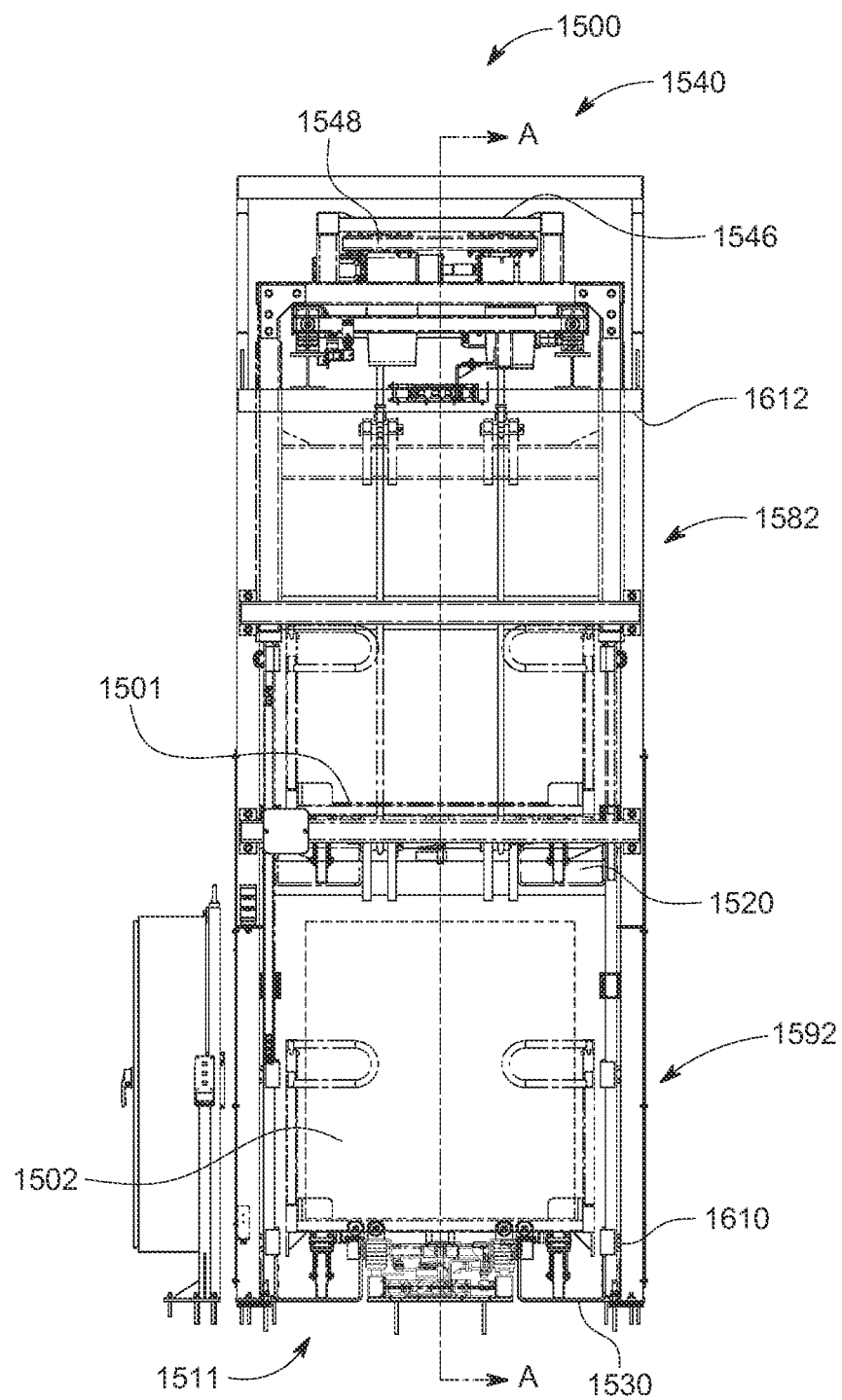
FIG. 16C shows in a diagrammatic form an end view from the load side of the cart or rack loader/unloader and switcher system with the loaded rack or cart on the second transfer carriage in a raised or elevated position for transfer to the operator side and the loaded rack or cart on the first transfer carriage moved or positioned at the loading side.
Figure 16D:
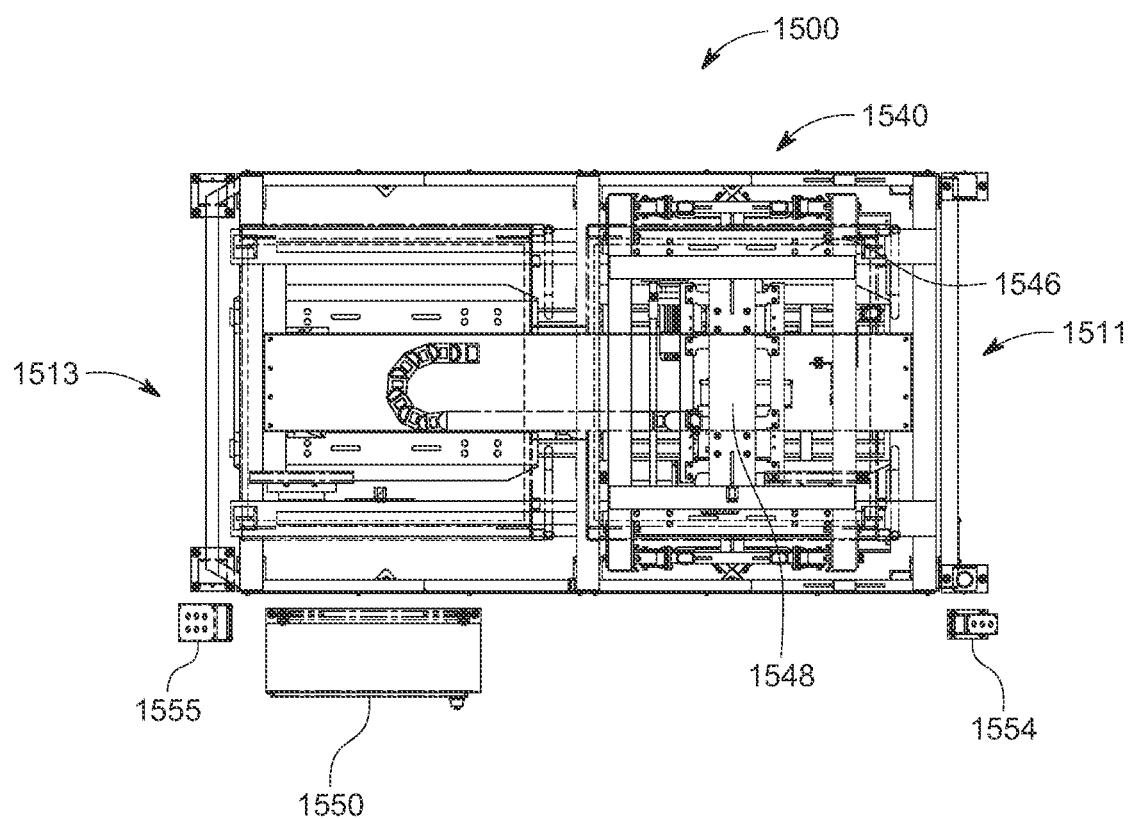
FIG. 16D shows in diagrammatic form a top view of the cart or rack loader/unloader and switcher system.

As shown in FIGS. 15A and 16B, the travel lift mechanism 1540 includes a hoist or lift frame or structure indicated generally by reference 1570. The lift frame 1570 comprises first and second side members 1572, indicated individually by references 1572a and 1572b, each side member being coupled or affixed to a respective side of the first transfer carriage 1520 as shown in FIG. 15A. The hoist or lift frame 1570 includes a horizontal or cross member 1574 which according to an exemplary embodiment is operatively coupled to the vertical drive or lift mechanism 1546 through dual cables or rods 1576, indicated individually by references 1576a and 1576b, attached or coupled to the cross member 1574 through respective brackets 1578.

Reference is made to FIG. 15A, which shows the first transfer carriage 1520 and the travel lift mechanism 1540 in a lowered position indicated by reference 1581 and positioned for receiving a rack or bin cart 1501 (FIG. 15B). The lowered position 1581 allows an operator, e.g. a forklift driver, to load the rack or bin cart onto the first transfer carriage 1520 at the load side of the switcher system 1500 as shown in FIG. 15B. As shown, the rack or bin cart 1501 is loaded or positioned on the first transfer carriage 1520 in the rack loader/unloader and switcher system 1500, as also shown in FIGS. 16A and 16C. The rack or bin cart 1501 may comprise, or carry, a bin or a rack loaded with parts or components, or a cart loaded with parts or components. In the context of the present description, the rack or bin cart 1501 is loaded with parts or components utilized on an assembly line in an automobile or vehicle manufacturing facility or application.

As shown in FIGS. 15B and 16B, the second transfer carriage 1530 is positioned or located at the operator side 1513 of the rack loader/unloader and switcher system 1500, as indicated generally by reference 1590. At the operator side 1513, the rack or bin on the second transfer carriage 1530 can be accessed by an operator, e.g. an assembly line worker.

To provide the capability to switch the rack or bin on the second transfer carriage 1530 with the rack or bin 1501 loaded on the first transfer carriage 1520, the travel lift mechanism 1540 is actuated, for example, using the first operator control panel 1554 at the load side 1511. In response, the travel lift mechanism 1540 raises or lifts the first transfer carriage 1520 and the loaded rack or bin cart 1501 to an elevated or bypass position as shown in FIG. 16C and indicated by reference 1582. In the bypass position 1582, the second transfer carriage 1530 and the rack or bin cart 1502 are movable between the operator side 1513 and the load side 1511 of the loader/unloader and switcher system 1500 as indicated by arrow 1592 in FIG. 16B, utilizing the horizontal drive mechanism 1522 under the control of the control system 1550. For instance in a manner similar to that described above for the embodiment, the rack or bin cart 1502 is accessed by the operator at the operator side 1513 and once unloaded or empty, the operator uses the second operator control panel 1555 to move of the second transfer carriage 1530 and the empty rack or bin cart 1502 from the operator side 1513 to the load side 1511. At the load side 1511, the empty rack or bin cart 1502 is removed, i.e. lifted, from the second transfer carriage 1530, for example, using a forklift, and a new or loaded rack or bin cart 1502 may loaded onto the second transfer carriage 1530. At the same time or sequentially, the first transfer carriage 1520 with the loaded rack or bin cart 1501 is moved horizontally in the elevated position 1582 from the load side 1511 to the operator side 1513 of the switcher 1500, and then lowered to a lower position at the operator side 1513 and indicated by reference 1590. The rack or bin cart 1501 is accessed by the operator at the operator side 1513 and once unloaded or empty, the travel or movement of the first transfer carriage and the empty rack or bin cart 1501 is reversed, with the operator using the second operator control panel 1555 to initiate a rack or bin cart switch sequence. In a manner similar to that described above, the switch sequence comprises the first transfer carriage 1520 and the empty rack or bin cart 1501 being raised or lifted by the travel lift mechanism 1546 to an elevated position at the operator side 1513. Once raised, the second transfer carriage 1530 with the freshly loaded rack or bin cart 1502 is moved from the load side 1511 to the operator side 1513 utilizing the horizontal drive 1522. The first transfer carriage 1520 and the empty rack or bin cart 1501 is moved above the second transfer carriage 1530 utilizing the horizontal drive mechanism 1548 from the operator side 1513 to the load side 1511, and then lowered using the vertical lift mechanism 1546 to the lowered position 1580, under the control of the control panel 1550. In the lowered position, the empty rack or bin cart 1501 is removed or lifted off the first transfer carriage 1520 and replaced with a loaded rack or bin cart.

It will be appreciated that the configuration of the switcher 1500 according to this embodiment provides the capability to move or manipulate two racks, or two bins, in the same footprint (i.e. with the frame 1510 of the switcher 1500) between the loading/unloading side 1511 and the operator or line side 1513. For instance, by effectively utilizing the available vertical or height clearance normally available at the assembly line station. It will be further appreciated that since floor space alongside an assembly line or automated manufacturing facility is typically limited, the capability to handle two containers simultaneously or sequentially is advantageous, and can serve to prevent bottlenecks arising from delayed delivery of parts or components.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A system for providing industrial parts to a production line or facility, said system comprising:
    a lower frame and an external frame connected to said lower frame, and said lower frame having a loading side and an operator side;
    a lift mechanism coupled to said lower frame and said external frame, and said lift mechanism comprising a lift frame and a lift operatively coupled to said lift frame and an upper drive mechanism, said lift being configured to raise and lower said lift frame between an elevated position and a lowered position, said upper drive mechanism being coupled to said external frame and operatively coupled to said lift frame and configured to move said lift frame in the elevated position between said loading side and said operator side;
    said loading side being configured with a load side sensor, and said operator side being configured with an operator side sensor;
    a controller, said controller having an input/output module, said input/output module being operatively coupled to said load side sensor and to said operator side sensor;
    a first carriage for carrying a first bin, said first carriage being operatively coupled to said lift frame and operatively coupled to said lift mechanism and said lift mechanism being further configured to move said first carriage between said lowered position and said elevated position at said loading side and at said operator side under the control of said controller;
    a second carriage for carrying a second bin, said second carriage being operatively coupled to said lower frame and operatively coupled to a lower drive mechanism configured to move said second carriage between said loading side and said operator side under the control of said controller;
    said external frame including a loading side position sensor and an operator side position sensor operatively coupled to said controller, said loading side position sensor being configured to detect when said first carriage or said second carriage is positioned in a loading/unloading position at the loading side, and said operator side position sensor being configured to detect when said first carriage or said second carriage is positioned in a loading/unloading position at the operator side;
    said controller being configured to operate said lift mechanism in a bypass mode, said bypass mode comprising moving said lift frame and said first carriage in the elevated position above the lower frame between said loading side and said operator side;
    said controller being further configured to operate said lower drive mechanism to move said second carriage between said loading side and said operator side when said first carriage is in the elevated position when said lift frame and said first carriage are in said elevated position;
    said controller being configured to be responsive to an input from said load side sensor indicating a breach condition, and in response to the occurrence of a breach condition during any movement of said first carriage, any movement of said second carriage or any movement of said lift mechanism, said controller being configured to generate a cycle-stop state; and
    said controller being configured to be responsive to an input from said operator side sensor indicating a breach condition, and in response to the occurrence of a breach condition during any movement of said first carriage, any movement of said second carriage or any movement of said lift mechanism, said controller being configured to generate a cycle-stop state.

2. The system as claimed in claim 1, wherein said lift mechanism is operatively coupled to said lift frame, and said lift frame being configured for receiving said first carriage, said upper drive mechanism being configured for moving said lift frame and said first carriage between said lowered position and said elevated position under the control of said controller, and further including a second upper drive mechanism configured to move said lift frame and said first carriage between said loading side and said operator side in said elevated position.

3. The system as claimed in claim 2, further including a safety indicator, said safety indicator being operatively coupled to the input/output module of said controller, and said controller being configured to operate said safety indicator in two modes comprising a clear to enter state for loading/unloading at said loading side, and a not clear to enter state at said loading side, and in said not clear to enter state said controller being configured to be responsive to any actuation of said load side sensor.

4. The system as claimed in claim 3, wherein said loading side includes a loading side control panel being operatively coupled to the input/output module of said controller, and said loading side control panel comprising a reset loading side sensor actuator, wherein in response to actuation of said reset loading side sensor actuator, said controller being configured to actuate said first drive mechanism to move said first carriage and said first bin from said loading side to said operator side, and said controller being configured to disable said operator side sensor so that an operator can access said first bin loaded with the industrial parts on said first carriage.

5. The system as claimed in claim 2, wherein said operator side includes an operator panel being operatively coupled to the input/output module of said controller, and said operator panel comprising an operator cycle start actuator, wherein in response to actuation of said operator cycle start actuator, said controller being configured to actuate said lift mechanism to raise said first carriage and said first bin from a first lower position at said operator side to a first upper position above said lower frame, said controller being configured to activate a lower drive mechanism to move said second carriage with a loaded second bin from said loading side to said first lower position at said operator side, and said controller being configured to activate said upper drive mechanism to move said first carriage and said first bin from said first upper position to a second upper position above said lower frame, and said controller being configured to actuate said lift mechanism to lower said first carriage and said first bin to a second lower position at said loading side, so that said first bin can be replaced with another bin loaded with the industrial parts.

6. The system as claimed in claim 5, further including an operator side upper position location sensor operatively coupled to the input/output module of said controller and configured to generate an output indicating the position of said first carriage or said second carriage at said first upper position at said operator side, and a loading side upper position location sensor operatively coupled to the input/output module of said controller and configured to generate an output indicating the position of said first carriage or said second carriage at said second upper position at said loading side.

7. The system as claimed in claim 6, wherein said operator panel includes a reset state actuator for said load side sensor, wherein in response to actuation of said reset state actuator, said controller being configured to disable said load side sensor so that said first bin can be replaced with another bin loaded with materials at said loading side.

8. The system as claimed in claim 6, further including a first speed sensor operatively coupled to the input/output module of said controller and configured to sense the moving speed of said second carriage between said loading side and said operator side, a second speed sensor operatively coupled to the input/output module of said controller and configured to sense the moving speed of said first carriage between said first lower position and said first upper position at said operator side, a third speed sensor operatively coupled to the input/output module of said controller and configured to sense the moving speed of said first carriage between said first upper position at said operator side and said second upper position at said loading side, and a fourth speed sensor operatively coupled to the input/output module of said controller and configured to sense the moving speed of said first carriage between said second upper position and said second lower position at said operator side, and said controller being configured to control said lower drive mechanism, said upper drive mechanism, and said lift mechanism, to reduce the moving speed of said first carriage, said second carriage and/or said lift mechanism if said moving speed exceeds a pre-determined threshold.

9. The system as claimed in claim 1, further including an operator side upper position location sensor operatively coupled to the input/output module of said controller and configured to generate an output indicating the position of said first carriage at a first upper position at said operator side, and a loading side upper position location sensor operatively coupled to the input/output module of said controller and configured to generate an output indicating the position of said first carriage or said second carriage at a second upper position at said loading side.

10. An industrial materials handling and delivery system, comprising:

a base member having a loading end and an operator end;
said loading end being configured with a loading side sensor, and said operator end being configured with an operator side sensor;
a controller, said controller having an input/output module, said input/output module being operatively coupled to said loading side sensor and to said operator side sensor;
a first carriage for carrying a first bin, said first carriage being operatively coupled to said base member and operatively coupled to a first drive mechanism configured to move said first carriage between said loading end and said operator end under the control of said controller;
a second carriage for carrying a second bin, said second carriage being operatively coupled to said base member and operatively coupled to a second drive mechanism configured to move said second carriage between said loading end and said operator end under the control of said controller;
said base member including a loading side position sensor and an operator side position sensor operatively coupled to said controller, said loading side position sensor being configured to detect when said first carriage or said second carriage is positioned in a loading/unloading position at the loading end, and said operator side position sensor being configured to detect when said first carriage or said second carriage is positioned in a loading/unloading position at the operator end;
a bypass mechanism configured to support said second carriage and said second bin, said bypass mechanism being operatively coupled to the input/output module of said controller and responsive to control by said controller;
said bypass mechanism being operatively coupled to said base member and configured to move said second carriage between said loading end and said operator end under the control of said controller;
said bypass mechanism being further configured to operate in a bypass mode under the control of said controller, and in said bypass mode said bypass mechanism being operable to permit movement of said first carriage and said first bin between said loading end and said operator end independently of said second carriage and said second bin;
further including an additional first lower position location sensor operatively coupled to the input/output module of said controller and configured to generate an output indicating the position of said first carriage or said second carriage at a first lower carriage position at said operator end, an additional second lower position location sensor operatively coupled to the input/output module of said controller and configured to generate an output indicating the position of said first carriage or said second carriage at a second lower carriage position at said loading end, an additional first upper position location sensor operatively coupled to the input/output module of said controller and configured to generate an output indicating the position of said second carriage at a first upper carriage position at said operator end, and an additional second upper position location sensor operatively coupled to the input/output module of said controller and configured to generate an output indicating the position of said second carriage at a second upper carriage position at said loading end.

11. The industrial materials handling and delivery system as claimed in claim 10, wherein said bypass mechanism comprises a lift mechanism having a lower section operatively coupled to said base member and an upper section configured to support said second carriage, and said bypass mode comprising a raised position above said base member, and in said raised position said lift mechanism allowing for movement of said first carriage between said loading end and said operator end along said base member.

12. The industrial materials handling and delivery system as claimed in claim 10, wherein said controller is configured to generate an alarm and a cycle-stop condition if said loading side sensor is activated through a breach during any movement of the first carriage, any movement of the second carriage or any movement of said lift mechanism.

13. The industrial materials handling and delivery system as claimed in claim 11, further including a safety indicator, said safety indicator being operatively coupled to the input/output module of said controller, and said controller being configured to operate said safety indicator in two modes comprising a clear to enter state for loading/unloading at said loading end, and a not clear to enter state at said loading end, and in said not clear to enter state said controller being configured to be responsive to any actuation of said loading side sensor.

14. The industrial materials handling and delivery system as claimed in claim 12, wherein said operator panel includes a reset state actuator for said loading side sensor, wherein in response to actuation of said reset state actuator, said controller being configured to disable said loading side sensor so that said second bin can be replaced with another bin loaded with materials at said loading end.

15. The industrial materials handling and delivery system as claimed in claim 12, further including a first speed sensor operatively coupled to the input/output module of said controller and configured to sense the moving speed of said first carriage between said loading end and said operator end, a second speed sensor operatively coupled to the input/output module of said controller and configured to sense the moving speed of said second carriage between said first lower carriage position and said first upper carriage position at said operator end, a third speed sensor operatively coupled to the input/output module of said controller and configured to sense the moving speed of said second carriage between said first upper carriage position at said operator end and said second upper carriage position at said loading end, and a fourth speed sensor operatively coupled to the input/output module of said controller and configured to sense the moving speed of said second carriage between said second upper carriage position and said second lower carriage position at said loading end, and said controller being configured to control said lower drive mechanism, said upper drive mechanism, and said lift mechanism, to reduce the moving speed of said first carriage, said second carriage and/or said lift mechanism if said moving speed exceeds a pre-determined threshold.

16. The industrial materials handling and delivery system as claimed in claim 10, wherein said operator end includes an operator panel being operatively coupled to the input/output module of said controller, and said operator panel comprising an operator cycle start actuator, wherein in response to actuation of said operator cycle start actuator, said controller being configured to actuate said lift mechanism to raise said second carriage and said second bin from said first lower carriage position at said operator end to said first upper carriage position above said base member, said controller being configured to activate a lower drive mechanism to move said first carriage with a loaded first bin from said loading end to said first lower carriage position at said operator end, and said controller being configured to activate an upper drive mechanism to move said second carriage and said second bin from said first upper carriage position to said second upper carriage position above said base member, and said controller being configured to actuate said lift mechanism to lower said second carriage and said second bin to said second lower carriage position at said loading end, so that said second bin can be replaced with another bin loaded with industrial materials.

17. The industrial materials handling and delivery system as claimed in claim 10, wherein said loading end includes a loading side control panel being operatively coupled to the input/output module of said controller, and said loading side control panel comprising a reset loading side sensor actuator, wherein in response to actuation of said reset loading side sensor actuator, said controller being configured to actuate said first drive mechanism to move said first carriage and said first bin from said loading end to said operator end, and said controller being configured to disable said operator side sensor so that an operator can access said first bin loaded with industrial materials on said first carriage.

* * * * *